US007756948B2

(12) United States Patent
Murata

(10) Patent No.: US 7,756,948 B2
(45) Date of Patent: *Jul. 13, 2010

(54) COLLECTED DATA PROVIDING APPARATUS AND PORTABLE TERMINAL FOR DATA COLLECTION

(75) Inventor: Yoshiyuki Murata, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 123 days.

This patent is subject to a terminal disclaimer.

(21) Appl. No.: 12/103,664

(22) Filed: Apr. 15, 2008

(65) Prior Publication Data

US 2008/0201189 A1 Aug. 21, 2008

Related U.S. Application Data

(62) Division of application No. 10/648,859, filed on Aug. 25, 2003, now Pat. No. 7,386,601.

(30) Foreign Application Priority Data

Aug. 28, 2002 (JP) ............................. 2002-248563
Aug. 30, 2002 (JP) ............................. 2002-254659

(51) Int. Cl.
    *G06F 15/16* (2006.01)
(52) U.S. Cl. .................................................. 709/217
(58) Field of Classification Search ................ 709/204, 709/217–219, 223–224
    See application file for complete search history.

(56) References Cited

U.S. PATENT DOCUMENTS 6,112,206 A * 8/2000 Morris et al. ................. 707/10
6,319,199 B1 * 11/2001 Sheehan et al. ............. 600/200
6,507,864 B1 * 1/2003 Klein et al. .................. 709/201
6,694,359 B1   2/2004 Morris et al.
7,548,878 B2 * 6/2009 O'Halloran et al. ........... 705/28
7,583,401 B2 * 9/2009 Lewis ........................ 358/1.16
2002/0087555 A1 7/2002 Murata

FOREIGN PATENT DOCUMENTS

| JP | 8-322091 A   | 12/1996 |
| JP | 11-288422 A  | 10/1999 |
| JP | 2002-169878 A | 6/2002 |
| JP | 2002-183380 A | 6/2002 |
| JP | 2002-218436 A | 8/2002 |

OTHER PUBLICATIONS

Japanese Office Action dated Feb. 19, 2008, issued in counterpart Japanese Application No. 2002-248563, and English translation thereof.

* cited by examiner

*Primary Examiner*—Krisna Lim
(74) *Attorney, Agent, or Firm*—Frishauf, Holtz, Goodman & Chick, P.C.

(57) ABSTRACT

A collected data providing apparatus and a portable data collecting terminal capable of collecting valuable effective data from object of data collection. When a server receives a data-collection request from a data collection requester's terminal, the server examines whether or not there is a data collector with a terminal in the vicinity of a place of data collection included in the request. If there is, the server sends a data collection request to the portable terminal, which receives the request, collects data on the place at the request, and then sends the server the collected data. The server then delivers this collected data to the data collection requester's terminal (FIG. 1).

3 Claims, 17 Drawing Sheets

FIG. 2

| INPUT UNIT | ← 13 |
|---|---|
| TERMINAL ID DATA STORAGE | — 13a |
| POSITION LOCATING FUNCTION | — 13b |
| IMAGE PICKUP FUNCTION | — 13c |
| TIME RECORDING FUNCTION | — 13d |
| DATA COLLECTING SITUATION TRANSMITTING FUNCTION | — 13e |

FIG. 3A

| 9a | 9b | 9c |
|---|---|---|
| SERVER ROM 9 |||
| DATA-COLLECTOR RECRUITING HOME PAGE | REGISTERED DATA COLLECTOR-RELATED INFO. | COLLECTOR TERMINAL'S VICINITY INFO. |
| DATA COLLECTION REQUEST | DATA COLLECTION TIME-LIMIT<br>• ARTICLE INSERTING TIME<br>• LIST OF REWARDS & CORR. ARTICLE INSERTING TIMES | REWARD PAYMENT REQUEST |
| 9d | 9e | 9f |

FIG. 3B

| 15a | | 15c |
|---|---|---|
| ROM OF DATA COLLECTOR'S TERMINAL 15 |||
| INFO. ON A DEVICE TO BE USED |||
| • DEVICE ID (INCLUDING A PHOTOGRAPHER'S NAME) | • POSITION LOCATING FUNCTION (LATITUDE, LONGITUDE, HEIGHT BY GPS) | • IMAGE PICKUP FUNCTION (ELECTRONIC CAMERA) |
| • TIME RECORDING FUNCTION<br>• (RECEIVE STANDARD RADIO WAVES, GPS TIME) | • DATA-COLLECTING SITUATION TRANSMITTING FUNCTION<br>(KEYBORAD, TALKING OR HANDWRITING INPUT) | REWARD PAYMENT REQUEST |
| 15d | 15e     15b | 15f |

FIG. 4A

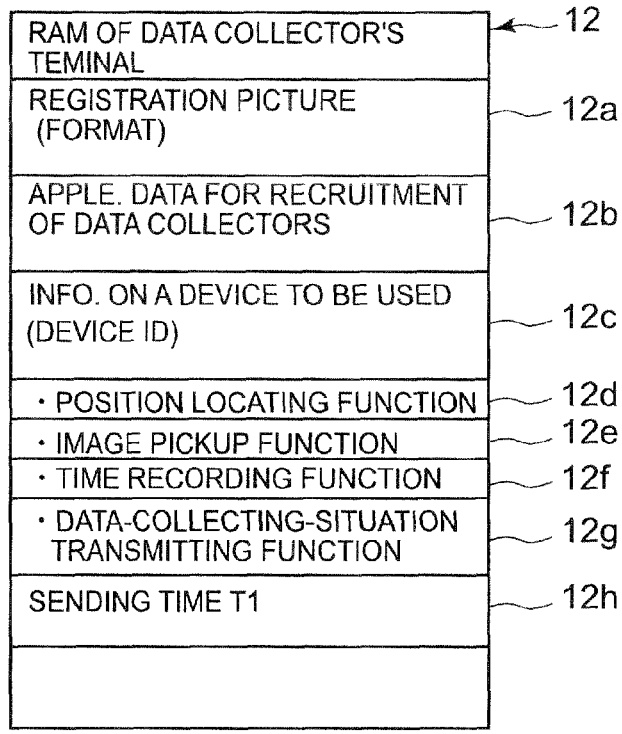

- 12 — RAM OF DATA COLLECTOR'S TEMINAL
- 12a — REGISTRATION PICTURE (FORMAT)
- 12b — APPLE. DATA FOR RECRUITMENT OF DATA COLLECTORS
- 12c — INFO. ON A DEVICE TO BE USED (DEVICE ID)
- 12d — · POSITION LOCATING FUNCTION
- 12e — · IMAGE PICKUP FUNCTION
- 12f — · TIME RECORDING FUNCTION
- 12g — · DATA-COLLECTING-SITUATION TRANSMITTING FUNCTION
- 12h — SENDING TIME T1

FIG. 4B

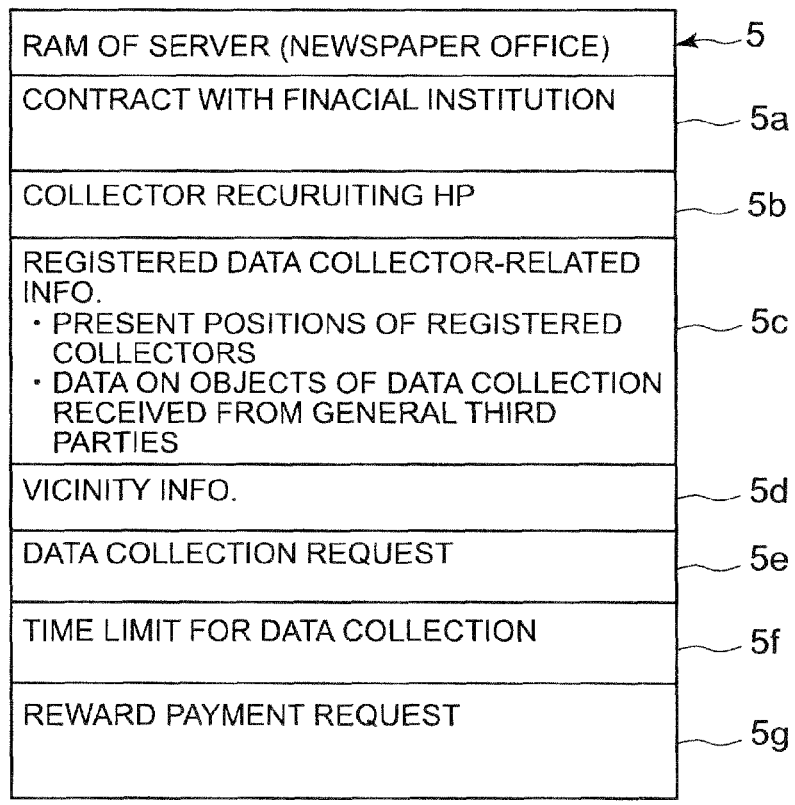

- 5 — RAM OF SERVER (NEWSPAPER OFFICE)
- 5a — CONTRACT WITH FINACIAL INSTITUTION
- 5b — COLLECTOR RECURUITING HP
- 5c — REGISTERED DATA COLLECTOR-RELATED INFO.
  · PRESENT POSITIONS OF REGISTERED COLLECTORS
  · DATA ON OBJECTS OF DATA COLLECTION RECEIVED FROM GENERAL THIRD PARTIES
- 5d — VICINITY INFO.
- 5e — DATA COLLECTION REQUEST
- 5f — TIME LIMIT FOR DATA COLLECTION
- 5g — REWARD PAYMENT REQUEST

FIG. 12A

| DATA-COLLECTOR RECRUITING HOME PAGE (109a) | REGISTERED DATA COLLECTOR/DATA COLLECTION REQUESTOR-RELATED INFO. (109b) | COLLECTOR TERMINAL'S VICINITY INFO. (109c) |
|---|---|---|
| \multicolumn{3}{c}{MANAGEMENT SERVER1S ROM (109)} | | |
| DATA COLLECTION REQUEST INFO. (109d) | TIME LIMIT FOR DATA COLLECTION:<br>• ARTICLE INSERTING TIME<br>• LIST OF REWARDS & CORR. ARTCLE INSERTING TIMES (109e) | REWARD PAYMENT REQUEST (109f) |

FIG. 12B

ROM OF DATA COLLECTION REQUESTER'S TERMINAL (115)

INFO. ON A DEVICE TO BE USED

| • DEVICE ID (INCLUDING A PHOTOGRAPHER'S NAME) (115a) | • POSITION LOCATING FUNCTION (LATITUDE, LONGITUDE, HEIGHT BY GPS) (115b) | • IMAGE PICKUP FUNCTION (ELECTRONIC CAMERA) (115c) |
|---|---|---|
| • TIME RECORDING FUNCTION<br>• (RECEIVE STANDARD RADIO WAVES, GPS TIME) (115d) | • DATA-COLLECTING SITUATION TRANSMITTING FUNCTION (KEYBOARD, TALKING OR HANDWRITING INPUT) (115e) | REWARD PAYMENT REQUEST (115f) |

FIG. 12C

ROM OF DATA COLLECTOR1S TERMINAL — 125
- 125a, 125b, 125c

| INFO. ON A DEVICE TO BE USED | | |
|---|---|---|
| · DEVICE ID (INCLUDING A PHOTOGRAPHER'S NAME) | · POSITION LOCATING FUNCTION (LATITUDE, LONGITUDE, HEIGHT BY GPS) | · IMAGE PICKUP FUNCTION (ELECTRONIC CAMERA) |
| · TIME RECORDING FUNCTION · (RECEIVE STANDARD RADIO WAVES, GPS TIME) | · DATA-COLLECTING SITUATION TRANSMITTING FUNCTION (KEYBOARD, TALKING OR HANDWRITING INPUT) | REWARD PAYMENT REQUEST |

| | |
|---|---|
| RAM OF DATA COLLECTION REQUESTER'S TERMINAL | ← 112 |
| REGISTRATION PICTURE (FORMAT) | 112a |
| APPLE.DATA FOR RECRUITENT OF DATA COLLECTORS | 112b |
| INFO. ON A DEVICE TO BE USED (DEVICE ID) | 112c |
| · POSITION LOCATING FUNCTION | 112d |
| · IMAGE PICKUP FUNCTION | 112e |
| · TIME RECORDING FUNCTION | 112f |
| · DATA-COLLECTING-SITUATION TRANSMITTING FUNCTION | 112g |
| SENDING TIME T1 | 112h |

__US 7,756,948 B2__

COLLECTED DATA PROVIDING APPARATUS AND PORTABLE TERMINAL FOR DATA COLLECTION

The present application is a Divisional Application of U.S. application Ser. No. 10/648,859, now U.S. Pat. No. 7,386,601, filed Aug. 25, 2003, which is incorporated herein by reference.

BACKGROUND OF THE INVENTION

1. Field of the Invention

The present invention relates to collected data providing apparatus and portable terminals for collecting data.

2. Description of the Related Art

Collected data providing systems have been developed in which when a data collector or reporter sends, using his or her portable data collecting terminal, a picked-up image of an object of data collection, information on the position of the terminal, articles in the form of a voice mail and/or environmental data such as a peripheral temperature of the terminal simultaneously and wirelessly to an electronic newspaper server that supplies its subscribers with electronic newspapers through a network, the server receives such image and environmental data, studies these materials at an edition meeting, and then gives relevant instructions to the data collector or reporter concerned, requests another data collector or reporter having an data collection terminal to help the first-mentioned data collector or reporter in the data collection, and/or issues electronic newspapers including the articles, etc., based upon the collected data. Portable terminals for use in data collection have also been developed.

In each of the collected data providing system and the portable terminal for data collection, its electronic camera and digital video device are capable of inputting thereto as video information data on the situation of the scene of an accident or event. The terminal is capable of transferring image data to the electronic newspaper server. That is, the terminal is capable of fulfilling so-called basic data collecting functions that include inputting thereto a draft of characters and video information and also transferring them to the server.

Present-position locating means provided in the portable terminal is capable of automatically reporting to the server the position of the scene of an accident or event whose image was picked up and a place where the data collector or reporter is at present without causing the data collector or reporter to report such situation severally in speech to the server, and also tracing the action of the data collector or reporter himself or herself.

Since the terminal includes voice inputting means, the data collector or reporter can devote himself or herself to the data collection only by speaking about the situation of the scene while picking up the image of the scene without the need to pay heed to its communication and without missing the timing of valuable-data collection due to the collector or reporter inputting a draft to the terminal and/or calling a desired person and waiting for him or her to answer the phone during collecting the data at the scene of the accident or event.

The server receives image data, voice mail data and data on the position of the portable terminal from the terminal. A journalist on the server side assesses the situation of the scene using such data, drafts a news manuscript and reports it as immediate news in electronic newspaper. The server can give a different reporter instructions as to how he or she should act, for example, can instruct the different reporter to come to the reporter acting already at present at the scene for supporting purposes.

A live camera fixed in a local area is known through which people at a remote place can view the present situation of the scene by remote control.

With the collected data providing system and the portable terminal for data collection, however, the reporters are limited to ones of the newspaper office. Thus, they cannot rapidly and securely take an active part in collecting data on an accident such as a shed-blood accident, a traffic accident or a fire accident whose situation changes every moment.

With the live camera, it is fixed in the local area, as described above, and people in a remote place cannot rapidly and securely acquire useful picked-up images.

SUMMARY OF THE INVENTION

It is therefore an object of the present invention to provide a collected data providing apparatus and portable terminal for data collection, capable of rapidly and securely collecting valuable effective data on an object of data collection such as a shed-blood, a traffic or a fire accident.

It is another object of the present invention to provide a collected data providing apparatus and portable terminal for data collection, capable of rapidly and securely collecting valuable effective data on individual persons such as a man arranged to meet another person, a wandering old person and a lost child as well as social accidents such as a fire or a traffic accident.

It is still another object of the present invention to provide a collected data providing apparatus and portable terminal for data collection, capable of finding a data collector or reporter, present in the vicinity of the scene of an accident or object of data collection, from among registered reporters present dispersively all over the country and requesting the data collector or reporter to collect data on the scene of the accident or object whose situation is changing every moment in real time.

It is a further object of the present invention to provide a collected data providing apparatus and portable terminal for data collection, capable of rapidly and securely acquiring information on a useful picked-up image from a person with a portable terminal such as a cellular phone with a camera present in a specified area.

It is a still further object of the present invention to provide a collected data providing apparatus and portable terminal for data collection, capable of rapidly and securely acquiring information on a useful picked-up image from a data collector having a portable terminal such as a cellular phone with a camera present in a specified area.

In order to achieve the above objects, the present invention has the following features. The inventive collected data providing apparatus locates the position of an object of data collection, finds a portable terminal present in the vicinity of the located object of data collection, transmits the found portable terminal a request to collect data on the object of data collection, and receives from the portable terminal the data collected by the portable terminal at the request. Therefore, this apparatus is capable of locating the position of an object of data collection, finding a portable terminal present in the vicinity of the located object of data collection, transmitting the found portable terminal a request to collect data on the object of data collection, and receiving from the portable terminal the data collected by the portable terminal at the request.

BRIEF DESCRIPTION OF THE DRAWINGS

FIG. 2 illustrates the structure of an input unit of a data collector's terminal;

FIG. 3A shows the structure of a ROM of a server;

FIG. 3B shows the structure of a ROM of the data collector's terminal;

FIG. 4A shows the structure of a RAM of the data collector's reporter's terminal;

FIG. 4B shows the structure of a RAM of a newspaper office or server's terminal;

FIG. 12A illustrates the structure of a ROM of a management server;

FIG. 12B illustrates the structure of a ROM of the data collection requester's terminal;

FIG. 12C illustrates the structure of a ROM of the data collector's terminal;

FIG. 13A illustrates the structure of a ROM of the data collection requester's terminal;

DETAILED DESCRIPTION OF THE PREFERRED EMBODIMENTS

First Embodiment

Referring to FIGS. 1-9, a first embodiment of the present invention will be described in detail.

Figure 1:
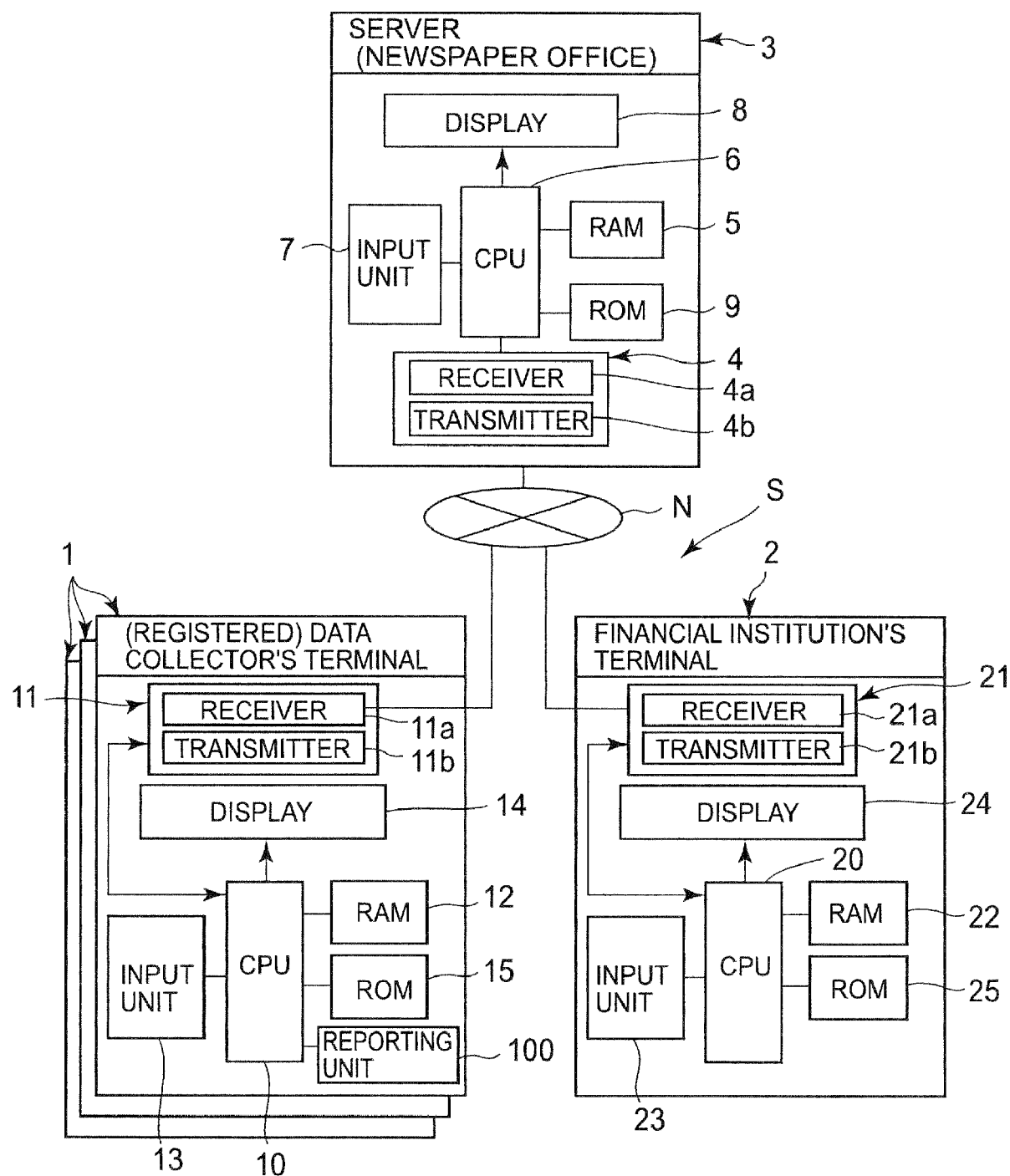
FIG. 1 is a block diagram of a collected data providing system as a first embodiment of the present invention.

FIG. 1 illustrates a whole collected-data providing system of the first embodiment.

As shown in FIG. 1, the collected-data providing system S includes a plurality of (registered) data collector's (or reporter's) terminals 1, a financial institution's terminal 2 and a collected-data providing server 3 such as a newspaper office connected through communication means or the Internet N as a network.

The collected-data providing server 3 comprises a CPU 6 as a core element that controls the respective other elements of the server 3, a receiver unit 4a as receiving means that receives data on application for recruitment of data collectors and collected data through the Internet N from the data collector's terminal 1, a RAM 105 that stores the collected data, etc., received from the receiver 4a, and a transmitter 4b as transmitting means that transmits data obtained as a result of processing the collected-data stored in RAM 105 and various other data through the Internet N to the data collector's terminal 1 and the financial institution's terminal 2. The receiver 4a and the transmitter 4b compose a communication unit 4.

The server 3 also includes an input unit 7 that inputs various data thereto, a display unit 8 that displays various data and a ROM 9 that has stored various data beforehand.

Each of the data collectors' terminals 1 includes a CPU 10 as a core element that controls all the respective other elements of the terminal 1, a receiver 11a that after the data collector 1 has applied to the server as the collected data provider for recruitment of data collectors, using his or her terminal 1, receives information related to a registered data collector, information on a data collection request, information on a notice of completion of reward transfer from the server 3 for data collection at the request, and information on a notice of completion of reward transfer from the financial institution terminal 2; and a transmitter 11b that sends the server 3 through the Internet N various information such as information on application for recruitment of data collectors, and collected data. The transmitter 11a and receiver 11b compose a communication unit 11.

The terminal 1 further comprises an input unit 13 that inputs various data thereto, a display 14 that displays various data, and a ROM 15 that has stored various data beforehand.

The input unit 13 comprises a terminal's ID data storage device 13a that has stored identity data for the terminal 1 itself, a position locating unit 13b that locates the present position of the terminal 1 itself, an image pickup unit 13c that picks up an image of objects around the terminal 1, a time recording unit 13d that records the present date, time and a day of the week, and a data-collecting-situation reporting unit 13e used to report a data collecting situation to the newspaper office.

The terminal's ID data storage device 13a has stored ID data on a manufacturer's serial No. of the terminal, a phone number, an owner's name, and a terminal holder's name. The position locating unit 13b includes a built-in GPS or a present-position locating device that locates the present position of the terminal 1 based upon the communication situation between the terminal 1 and a base station. The image pickup unit 13c includes an electronic image pickup device such as a digital camera or a digital video camera. The time recording unit 13d includes a built-in time recorder or a standard radio wave timepiece. The data-collection-situation reporting unit 13e includes a talking device through which the data collector of the terminal can talk to a user at another terminal, and a handwriting input device capable of inputting thereto collected data with a pen or in a handwriting manner or a keyboard capable of inputting thereto collected data by key operation.

The financial institution's terminal 2 includes a CPU 20 as a core that controls all other elements of the terminal 2, a receiver 21a that receives from the server 3 a request to pay a reward to a specified data collector, a RAM 22 that stores information received from the receiver 21a, and a transmitter 21b that transfers to a specified data collector's bank account an amount of money for the reward payment request from the server 3, and then sends a notice of completion of reward transfer to at least one of the data collector's terminal 1 and the server 3 through the Internet N. The receiver 21a and the transmitter 21b compose a communication unit 21.

The financial institution's terminal 2 further includes an input unit 23 that inputs various data thereto, a display device 24 that displays various data, and a ROM 25 that has stored various data beforehand.

FIG. 3A shows the ROM 9 provided in the server 3. The ROM 9 includes a data collector recruiting HP (Home Page) information storage area 9a, a registered data collector-related information storage area 9b, a vicinity information storage area 9c, a data collection request information storage area 9d, a data-collection time-limit information storage area 9e and a reward paying request information storage area 9f.

The data collector or data collector recruiting HP information storage area 9a has stored articles for recruiting data collectors. The registered data collector-related information storage area 9b has stored information related to the registered data collectors that will be reported to the persons that applied for recruitment of the data collectors. The vicinity information storage area 9c has stored information on the vicinities of a data collector's terminal that collects data on an object of data collection, wherein the information on the vicinities of the data collector's terminal will be used to measure the distance between the data collector's terminal and the object of data collection. The data collection request information storage area 9d has stored information to request a registered data collector to collect data. The data-collection time-limit information storage area 9e has stored information on a time limit for data acceptance of which the registered data collector should be informed. The data-collection time-limit information storage area 9e has stored a list of successive phased acceptable time zones in each of which the collected data can be accepted and sums of reward corresponding to the respective phase acceptance time zones. The successive phased acceptable time zones are between a time when the object of data collection appeared or occurred and a time limit for finally accepting data collected on the object into the newspaper. At an initial stage of occurrence of an event or accident whose data is to be collected, the corresponding sum of reward is highest and at the last stage of the time zone, the reward is lowest. The reward-payment-request storage area 9f has stored information requesting the financial institution to pay a proper reward to a specified data collector.

FIG. 3B shows a ROM 15 provided in the data collector's terminal 1. The ROM 15 includes a device ID information storage area 15a that has stored information on the terminal to be used, a position locating function information storage area 15b, an image pickup function information storage area 15c, a time recording function information storage area 15d, a data-collecting-situation transmitting function information storage area 15e and a reward payment request information storage area 15f.

The device ID information storage area 15a has stored information on the device ID of the data collector's terminal 1, and a registered photographer's name or owner's name. The position locating function information storage area 15b has stored the present position or location of the terminal 1 (latitude, longitude and height) located by a GPS built-in the terminal 1. The image pickup function information storage area 15c has stored information on the kind and device name of a digital camera or video camera included in the terminal. The time recording function information storage area 15d has stored information indicating whether or not time is obtained by standard radio waves or by a device such as a GPS. The data-collecting-situation transmitting function information storage area 15e has stored information indicating input means such as talking means, handwriting means or a keyboard for transmitting collected data. The reward-payment request information storage area 15f has stored information to request the financial institution to pay a proper reward to a specified data collector.

Figure 4C:
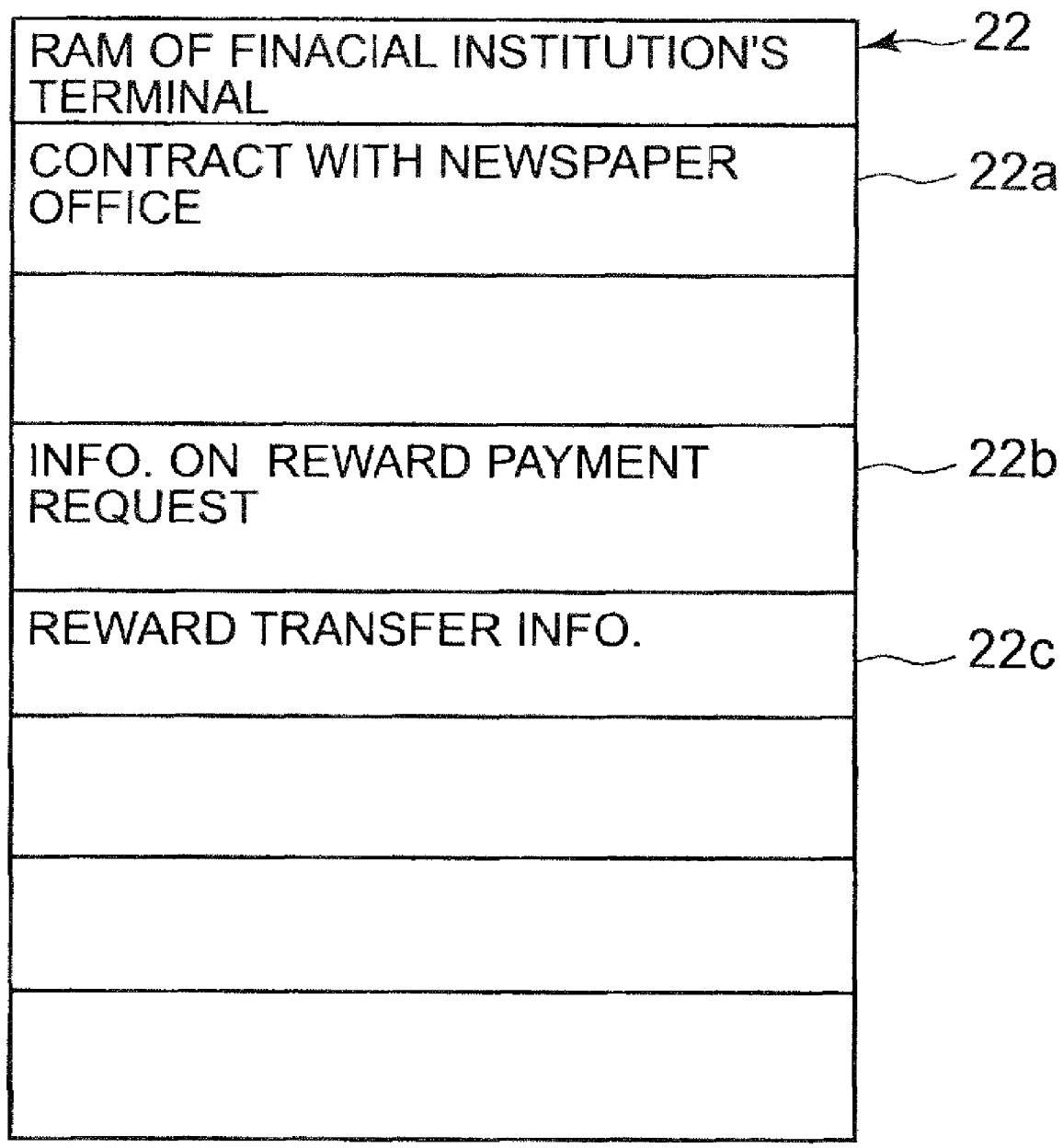
FIG. 4C shows the structure of a RAM of a financial institution's terminal.

FIGS. 4A, 4B and 4C show RAMs 12, 5 and 22 provided in the data collector's terminal 1, the server 3 and the financial institution's terminal 2, respectively.

The RAM 12 of the terminal 1 comprises a registered picture storage area 12a, data collector's application data storage area 12b, a device ID information storage area 12c, a position locating function information storage area 12d, an image pickup function information storage area 12e, a time recording function information storage area 12f, a data-collecting-situation transmitting function information storage area 12g, and a sending time storage area 12h.

The registered picture storage area 12a has stored a registered picture. The data collector application data storage area 12b has stored data necessary for applying for recruitment of data collectors. The device ID information storage area 12c has stored the ID of the data collector's terminal 1 itself, a registered photographer's name or an owner's name. The position locating function information storage area 12d has stored the present position or location (latitude, longitude and height) of the data collector's terminal 1 located, for example, by the built-in GPS of the terminal 1. The image pickup function information storage area 12e: has stored information such as the kind and name of a device such as a digital camera or video camera. The time recording function information storage area 12f has stored information about whether or not the time is acquired from the standard radio waves or using a device such as a GPS. The data-collecting-situation transmitting function information storage area 12g has stored information about which of talking means, handwriting input means and a keyboard is used to transmit the collected data. The reward-payment-request information storage area 12h has stored information to request the financial institution to pay a proper reward to a specified data collector.

The server RAM 5 has a financial institution contract information storage area 5a, a data collector recruiting HP information storage area 5b, a registered data-collector-related information storage area 5c, a vicinity information storage area 5d, a data-collection-request information storage area 5e, a data-collection time-limit information storage area 5f and a reward payment request information storage area 5g.

The financial institution contract information storage area 5a has stored information on contracts exchanged between the server 3 and the financial institution 2. The data collector recruiting HP information storage area 5b has stored articles on recruitment of data collectors. The registered data-collector-related information storage area 5c has stored information related to the registered data collectors (for example, information on the present positions (latitudes, longitudes and heights) of the respective registered collectors' terminals 1), information on an object of data collection, received periodically or in real time from the terminals 1, and information on objects of data collection received periodically or in real time from general third parties. The vicinity information storage area 5d has stored information on the vicinities of a data collector's terminal that collects data on an object of data collection, wherein the information on the vicinities of the data collector's terminal will be used to measure the distance between the data collector's terminal and the position of the object of data collection. The data collection request information storage area 5e has stored information requesting a registered data collector to collect data. The data-collection time-limit information storage area 5f has stored information on a time limit for data acceptance with which the registered data collector should be informed. More particularly, the data collecting time-limit information storage area 5f has stored a list of successive phased acceptance time zones, in each of which the collected data can be accepted, and sums of reward corresponding to the respective phased acceptance time zones. The successive phased acceptance time zones are between a time when the object of data collection appeared or occurred and a time limit for finally accepting data collected on the object in time for insertion into the newspaper. At the initial stage of occurrence of an event or accident whose data should be collected, the sum of reward is highest. At a later phase of time, the reward is lower, and at the last phase of time in which the collected data can be inserted in the newspaper narrowly in time, the reward is lowest. The reward payment request information storage area 5g has stored information requesting the financial institution to pay a proper reward to a specified data collector.

The RAM 22 of the financial institution's terminal has a newspaper office contract information storage area 22a, a reward payment request information storage area 22b and a reward transfer information storage area 22c.

The newspaper office contract information storage area 22a has stored information on contracts exchanged between the financial institution and the management server (for example, newspaper office). The reward payment request information storage area 22b has stored information on the newspaper office's request that the financial institution should pay a specified reward to a specified data collector. The reward-transfer information storage area 22c has stored information on transfer of a reward from the financial institution to the account of the specified data collector.

Figure 5:
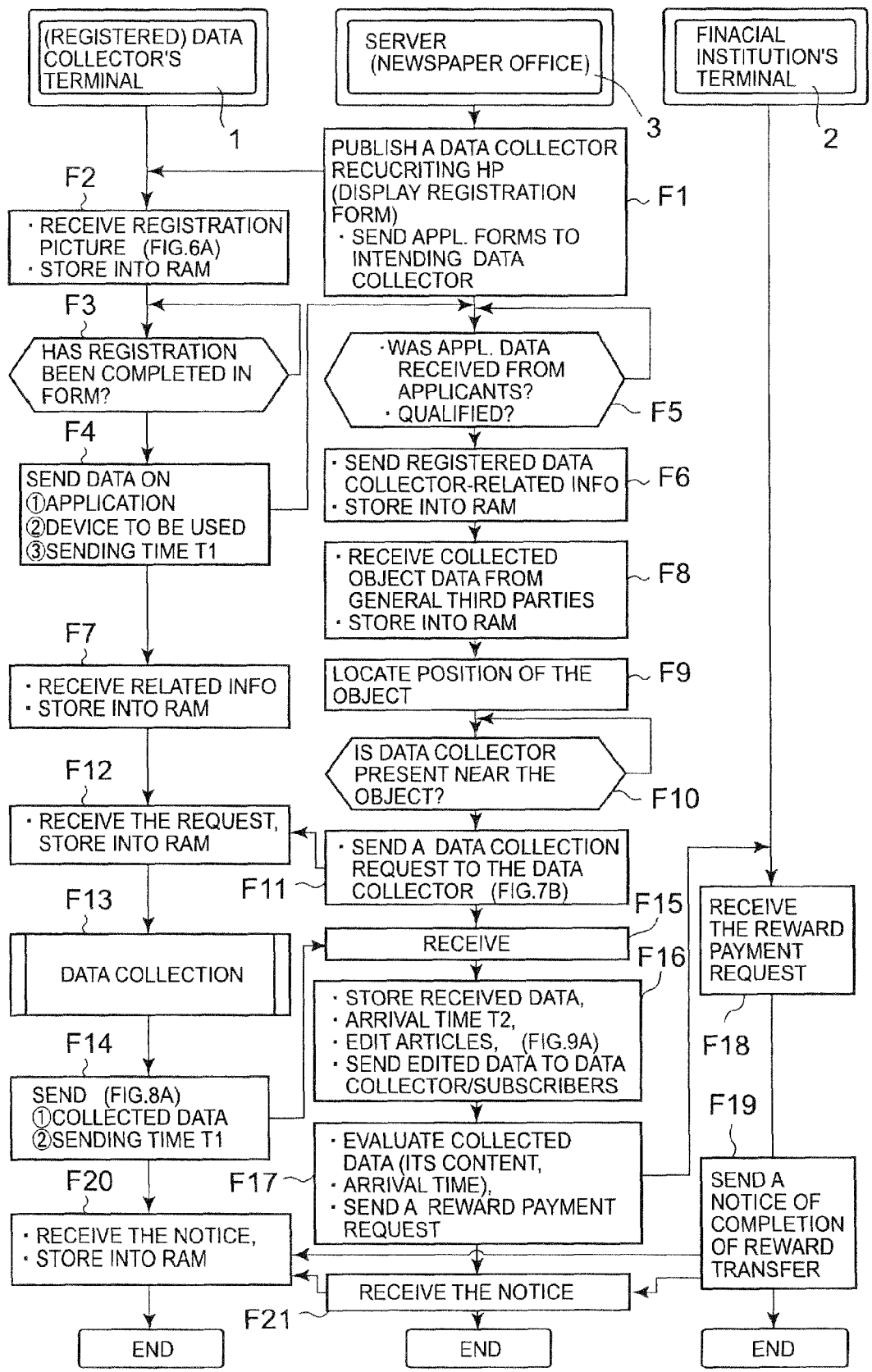
FIG. 5 illustrates a process to be performed by each of the terminals of the collected data providing system in the first embodiment.
Figure 6A:
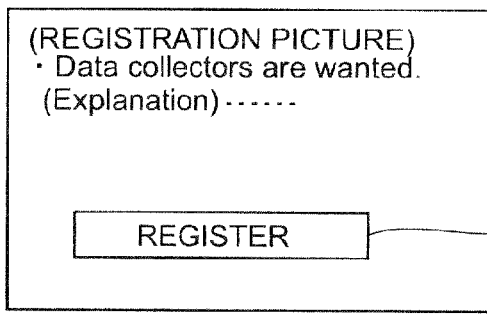
FIG. 6A illustrates a data collector recruiting and registering picture displayed on the data collector's terminal.

FIG. 5 shows processes which will be performed by the data collector's terminal 1, server 3 and financial institution's terminal 2. First, the server 3 publishes a data collector recruiting HP (home page) on the Internet to thereby display a registration form such as shown in FIG. 6A (step F1). When a person who desires to be a data collector accesses the server 3 through the Internet N, using his or her terminal 1, the registration form displayed on the server 3 is sent to the desirer's terminal through the Internet N (step F1). The terminal 1 receives registration picture data including the registration form and stores the registration picture data in the storage area 12a of RAM 12 (step F2).

When the registration picture (FIG. 6A) is displayed on the terminal 1, the desirer inputs data on his or her name, and the type of the terminal 1.

Figure 6B:
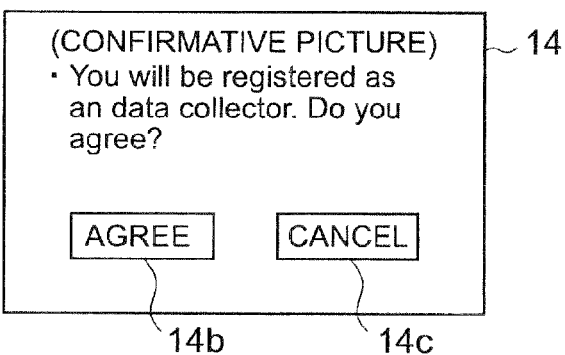
FIG. 6B illustrates a confirmative picture displayed on the data collector's terminal.

In a state where the received registration form picture is displayed on the display 14, as shown in FIG. 6A, CPU 10 determines whether or not a soft button "REGISTER" 14a on the picture was clicked. If it was clicked, the registration form picture is displayed as a confirmative picture on the display 14, as shown in FIG. 6B.

In a state where the registration form picture is displayed on the display 14, CPU 10 determines which of a soft button "COMFIRM" 14b and a soft button "CANCEL" 14c was clicked. When CPU 10 determines that the soft button "COMFIRM" 14b was clicked, CPU 10 terminates the determining process (step F3).

When the determining process has been terminated, the terminal 1 sends the server 3 the following data: that is, ① its application data, ② information on a device that the user uses, and ③ a confirmative operation time (sending time) T1. The ① application data represents the user's will with the terminal 1 to apply for the recruitment of data collectors published this time. The ② information on a device represents the terminal's ID, and the presence/absence of each of the position locating function, image pickup function, time recording function, and data-collecting-situation transmitting function stored in the storage areas 15a-15e, respectively, of ROM 15 or the storage areas 12c-12g, respectively, of RAM 12 of the terminal 1. The ③ confirmative operation (sending time) T1 represents the time when the soft button "confirm" 14b was clicked (step F4).

After step F4, the server 3 receives application data sent by the user or applicant at the terminal 1, and stores the data in the storage area 12b of RAM 12 (step F5). The server 3 then compares the data received from the terminal 1 and the device names, etc., stored beforehand in ROM 9 of the server 3 to thereby determine whether or not the terminal 1 itself is qualified for data collection. If it is qualified, the server 3 sends registered data-collector picture data of FIG. 7A as registered data collector-related information to the terminal 1 and also stores it into RAM 5c (step F5). The terminal 1 then receives the registered collector-related information from the server 3 (step F7). The user or applicant at terminal 1 who desires to become the data collector can view registered collector picture of FIG. 7A and know that he or she has been registered as a data collector in the server 3.

In the same manner, qualified data collectors are selected, determined and registered in the server 3 from among many applicants in the whole country or world who applied for recruitment of data collectors through their terminals 1. Since this time, the registered data collectors will act as such individually.

When the server 3 receives data on an object of data collection (including data on the positions of the scene of a fire, a traffic accident, etc., first information on the state of things of some accident, etc.) offered by a third party including the registered data collectors with their terminals, the server 3 stores the simple object data into RAM 12 (step F8). Then, the server 3 locates the position of the object of data collection (its longitude and latitude) based on place information included in the simple object data (step F9).

Then, the server 3 determines whether a data collector with a terminal 1 is present in the vicinity of the place of the object of data collection (step F10). This determination is performed based upon information on the present positions of data collectors' terminals 1 included in the object data received from the third party and information on the present positions of the other registered data collectors' terminals 1 (stored in the registered data collectors-related information storage device 5d) received periodically or in real time from the other registered data collectors' terminals 1.

The determination about whether or not there is a data collector with a terminal 1 present in the vicinity of the object of data collection varies depending upon the object or scene and type of data collection. In this embodiment the server 3 determines whether or not there is a data collector with a terminal present, for example, within a sphere of one kilometer from the present position of the object of data collection included in the request information received from the third party.

When the server 3 determines at step F10 that there is no data collectors' terminal 1, the server 3 expands, with the position of the object of data collection as the center, its sphere of search for a data collector's terminal 1 to try find a collector's terminal 1. As a result, if the server 3 finds the data collector's terminal 1, the server 3 sends the collector a data collection request (step F11). This request information includes the content of the request and a time limit for the data collection, for example, as shown in FIG. 7B.

Figure 7A:
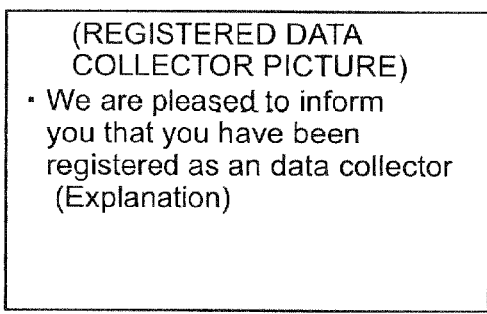
FIG. 7A illustrates a registered data collector picture displayed on the data collector's terminal.
Figure 7B:
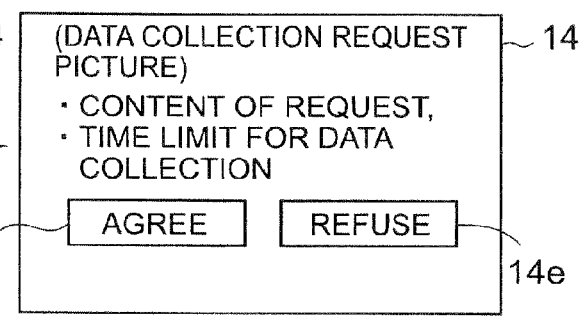
FIG. 7B illustrates a data collection request picture displayed on the data collector's terminal.

The terminal 1 receives this request information in the form of a data collection request picture of FIG. 7B (step F12). Since this request is very often urgent, the terminal 1 informs its data collector of reception of this request by sounds or vibrations produced by a reporting unit 100 or by a message displayed on the display 14 of the terminal 1.

The data collector at the terminal 1 confirms this request for data collection and determines whether or not he or she can accept the contents of the request and the time limit for data collection, and then clicks the soft button "AGREE" 14e or the soft button "REFUSE" 14f. The terminal 1 then determines which of the two buttons was clicked. If the soft button "AGREE" 14e is clicked, CPU 10 of the terminal 1 detects this clicking and terminates this determining process (step F12).

Then, the data collector at the terminal 1 starts his or her activities of data collection (step F13). The collector's activities mainly include image pickup of the scene of an accident or an object of data collection, storage of the picked-up image into RAM 12, and handwriting of the name of the place of the scene or object and the situation of the scene or object, while confirming the collected-data picture displayed on the display 4 of the terminal 1 shown in FIG. 8A. Information on ① place of data collection (its position and name), ② data collection time and term, ③ data collector's name (terminal's ID and a photographer's name, ④ picked-up image, and ⑤ device information may be inputted at the input unit 13 by the collector and displayed on the display 14. Alternatively, they may be automatically displayed on the display 14 based upon the information stored in the ROM 15 or RAM 12 of the terminal 1.

Figure 8A:
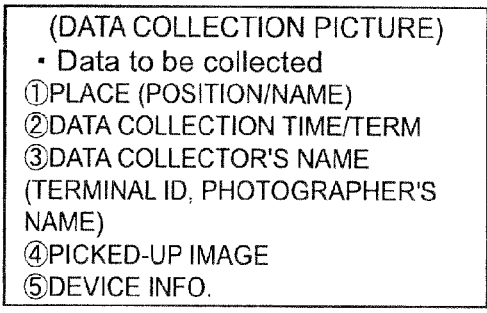
FIG. 8A illustrates a data collection picture displayed on the data collector's terminal.
Figure 8B:
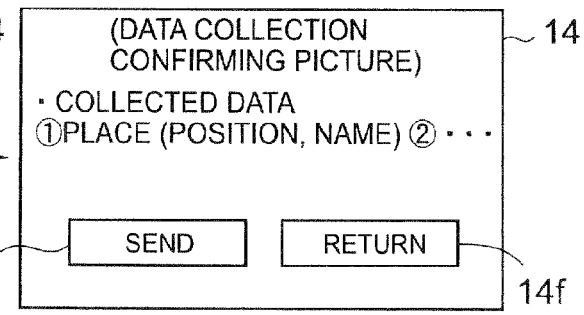
FIG. 8B illustrates a data collection confirming picture displayed on the data collector's terminal.

When the collector at the terminal 1 completes the collection of data at step S13, the collector confirms the "data collection confirming picture" of FIG. 8B while clicking the soft button "SEND" 14e or soft button "RETURN" 14f. The CPU 10 of the terminal 1 determines which of the soft buttons 14e and 14f was clicked. If the soft button "SEND" 14e was clicked, CPU 10 determines its clicking to thereby terminate this determining process (step F13).

When the determining process (at step S13) is terminated, CPU 10 shifts its control to step F14, where CPU 10 sends the server 3 the ① collected data and ② sending time T1. The ① collected data includes a picked-up image of the scene of the object of data collection, its name and present situation. The ② sending time T1 represents the time recorded by the time recording function of the terminal 1 when the soft button "SEND" 14e of the terminal 1 of FIG. 8B was clicked.

The server 3 receives the collected data and sending time T1 sent by the terminal 1 (step F15). The server 3 then stores the received collected data and sending time T1 in RAM 9. Then, the server 3 also stores an arrival time T2 of the data received from the data collector 1 and then edits articles based upon the collected data received from the terminal 1. A result of the edition is displayed as a picture such as a "newspaper article picture" of FIG. 9A. For example, an "image of the scene of a doubtful ship" was picked up by the data collector at the terminal 1. The data "collector: Mr. A", "time" and "place" are based upon on the "device information" received from the terminal 1.

The server 3 sends picture data as the result of the edition along with a questionnaire about whether or not the collected data is good to the terminals of all the subscribers including the terminal 1 (step F16). The subscribers are those who have beforehand contracted with the server 3 for real-time delivery of newspaper articles.

The server 3 then evaluates the collected data based upon the contents and arrival time of the collected data. In this evaluation, the contents of the questionnaires collected from the subscribers are allowed for. Of course, the evaluation may be made only by the questionnaires collected from the subscribers' terminals and not subjectively by the server 3. The arrival time T2 represents the time when the server 3 has received the collected data from the terminal 1. As the arrival time T2 is earlier, the collected data is evaluated as more valuable. Based upon evaluation of the collected data, the server 3 determines the sum of a reward to be paid to the data collector with the terminal 1 and then sends the financial institution's terminal 2 a request to pay the reward to the terminal 1 collector (step F17).

Figure 9A:
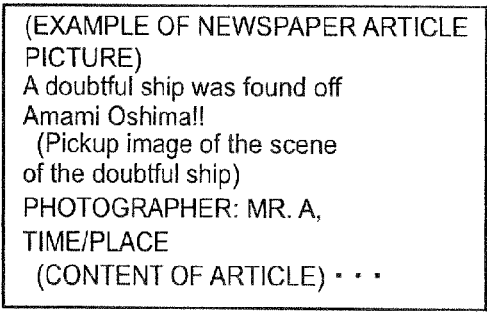
FIG. 9A illustrates a newspaper article picture.
Figure 9B:
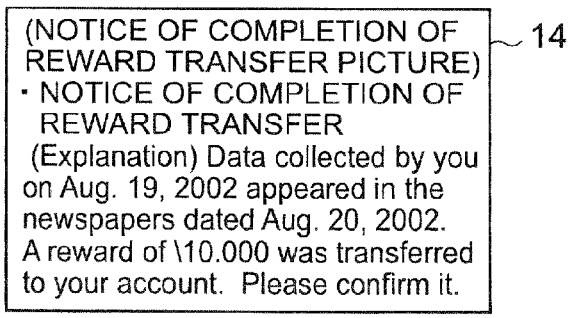
FIG. 9B illustrates a newspaper article picture and a notice-of-completion-of-reward-transfer picture.

When the financial institution's terminal 2 receives the request to pay the reward (step F18), it transfers the reward to the account of the terminal 1 and also sends a notice of completion of reward transfer to the terminal 1 (step F19). The notice of completion of reward transfer is shown, for example, as a picture of a "notice of completion of reward transfer" with an "explanation", as shown in FIG. 9B. In this case, alternatively, the notice of completion of reward transfer may be sent via the server 3 to the terminal 1. When the data collector's terminal 1 receives this notice from the financial institution's terminal 2 or the server 3, it stores the notice in RAM 12 (step 20).

Briefly, in this embodiment the data collector's terminal 1, server 3 and financial institution's terminal 2 are connected via the Internet N. The server 3 locates the position of an object of data collection (step F9) and then also check to see whether or not a data collector with a portable terminal 1 is present in the vicinity of the object of data collection (step F10). If the data collector with the portable terminal is present, the server 3 sends the terminal 1 a data collection request (step F11), and then waits for reception of data from that terminal collected at the request (step F15). The present invention is, however, not limited to this particular embodiment.

For example, the server 3, which is the collected data providing apparatus connected via the network N to the plurality of portable terminals 1, may comprise first receiving means or receiver 4a that receives a request to obtain data on the present situation of a specified place sent by a first one of the plurality of portable terminals 1, means for checking to see whether or not there is a second portable terminal 1 in the vicinity of the specified place, means for sending the second portable terminal 1, if any, a request for the second terminal to collect data on the present situation of the specified place, and a second receiving means or receiver 4a that receives from the second terminal data collected by the second terminal at the request. The server may further comprise first control means that controls the server so as to send the second portable terminal information on a price for collected data on the present situation of the place of data collection received by the second receiving means.

The above terminal 1 may comprise receiving means or a receiver 11a that receives a data collection request sent by the server 3, transmitting means or a transmitter 11b that sends the server 3 the data collected at the request. The terminal 1, which is connected to the server 3 as the collected data providing terminal, may comprise a transmitter 11b that sends the server 3 a request to receive data on the present situation of the specified place, and receiving means or a receiver 11a that receives data on the present situation of the specified place collected at the request.

While in the embodiment the data collector's terminal 1 and the server 3 comprise a portable personal computer, the present invention is not limited to this particular case. For example, they may be a portable terminal or electronic device such as a PDA, an electronic notebook, or a cellular phone.

As described above, according to this embodiment the collected data providing apparatus locates the position of an object of data collection, finds a portable terminal present in the vicinity of the object of data collection, sends the found portable terminal a request to collect data on the object of data collection, and then receives from the portable terminal the data collected by the portable terminal at the request. Therefore, the collected data providing apparatus is capable of locating the position of an object of data collection, finding a portable terminal present in the vicinity of the object of data collection, sending the found portable terminal a request to collect data on the object of data collection, and then receiving from the portable terminal the data collected by the portable terminal at the request.

Also, according to this embodiment the collected data providing apparatus is connected to a plurality of portable terminals through a network. The apparatus receives from a first one of the plurality of portable terminals a request to collect data on the present situation of a specified place, finds a second one of the plurality of portable terminals present in the vicinity of the specified place, sends the found second portable terminal a request to collect data on the present situation of the place, and receives from the second portable terminal the data collected by the second portable terminal at the request sent by the sending means. Therefore, the apparatus is capable of receiving from a first one of the plurality of portable terminals a request to collect data on the present situation of a specified place, finding a second one of the plurality of portable terminals present in the vicinity of the specified place, sending the found second portable terminal a request to collect data on the present situation of the place, and receiving from the second portable terminal the data collected by the second portable terminal at the request sent by the sending means.

Also, according to this embodiment the portable terminal apparatus for data collection receives a data collection request sent by a collected data providing terminal, and collects data at the request and then sends the collected data to the data providing terminal. Therefore, the terminal apparatus is capable of receiving a data collection request sent by a collected data providing terminal, and collecting data at the request and then sending the collected data to the data providing terminal.

Also, according to this embodiment the portable data-collecting terminal apparatus is connected to a collected-data providing terminal through a network. The apparatus sends the collected data providing terminal a request to collect and deliver data on the present situation of a specified place to the terminal apparatus, and receives from the collected data providing terminal data on the present situation of a specified place collected by the collected data providing terminal at the request. Therefore, the apparatus is capable of sending the collected data providing terminal a request to collect and deliver data on the present situation of a specified place to the terminal apparatus, and receiving from the collected data providing terminal data on the present situation of a specified place collected by the collected data providing terminal at the request.

Second Embodiment

A second embodiment of the present invention will be described in detail with reference to FIGS. 10-18B.

Figure 10:
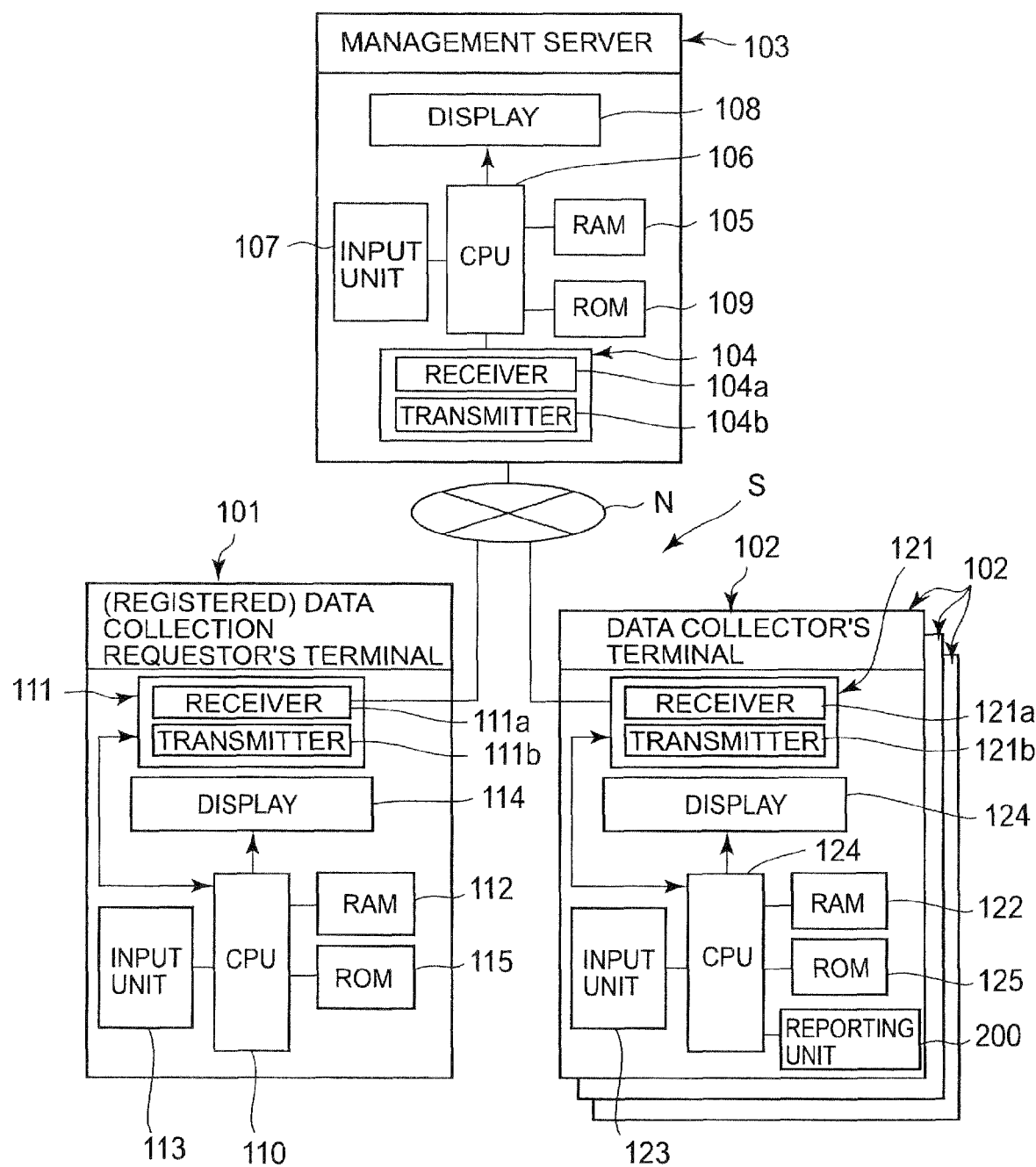
FIG. 10 is a block diagram of a whole collected data providing system as a second embodiment of the present invention.

FIG. 10 illustrates the whole of a collected data providing system according to the second embodiment. As shown in FIG. 10, the collected data providing system S comprises a (registered) data collection requester's terminal 101, data collector's terminals 102 and a management server 103 connected via communication means or a network as the Internet N.

The management server 103 comprises a CPU 106 as a core element that controls the respective other elements of the server 103, a receiver unit 104a as receiving means that receives data on application for recruitment of data collectors, and collected data through the Internet N from the registered data collection terminal 101 or the data collector's terminals 102, a RAM 105 that stores the collected data, etc., received from the receiver 104a, and a transmitter 104b as transmitting means that transmits data obtained by processing the collected data stored in RAM 105 and various other data and information through the Internet N to the data collection requester's terminal 101 and the data collector's terminal 102, etc. The receiver 104a and the transmitter 104b compose a communication unit 104.

The server 103 also includes an input unit 107 that inputs various data thereto, a display unit 108 that displays various data and a ROM 109 that has stored various data beforehand.

The data collection requesters' terminal 101 includes a CPU 110 as a core element that controls all the respective other elements of the terminal 101, and a receiver 111a that after the data collection requester's terminal 101 has applied to the server 103 for recruitment of data collectors, using his or her terminal 101, receives information related to the registered data collection requester information on a data collection request and information on a notice of completion of reward transfer from the server 103 and information on a notice of completion of reward transfer from a financial institution terminal (not shown); and a transmitter 111b that sends through the Internet N various information such as information on application for recruitment of data collectors, and collected data to the server 103. The transmitter 111a and receiver 111b compose a communication unit 111.

The data collector's terminal 101 further comprises an input unit 113 that inputs various data thereto, a display 114 that displays various data, and a ROM 115 that has stored various data beforehand.

Figure 11A:
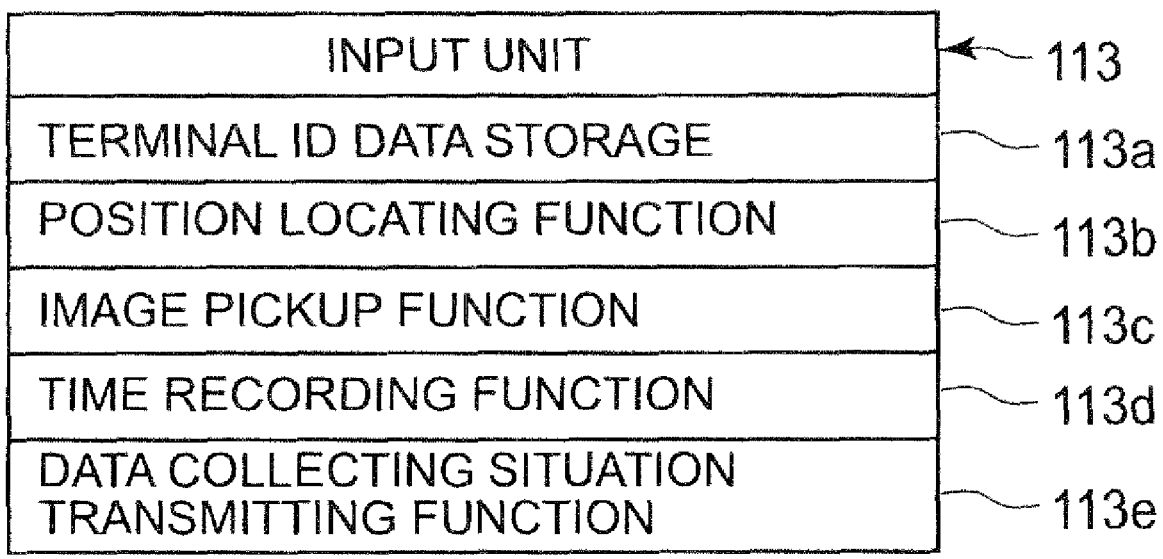
FIG. 11A illustrates the structure of an input unit of a data collection requester's terminal.

As shown in FIG. 11A, the input unit 113 comprises a terminal ID data storage device 113a that has stored identity data for the data requester's terminal 101 itself, a position locating unit 113b that locates the present position of the terminal 101 itself, an image pickup unit 113c that picks up an image of objects around the terminal 101, a time recording unit 113d that records the present date, time and a day of the week, and a data-collecting-situation reporting unit 113e used to report a data collecting situation to external terminals such as the data collection requester's terminal 101 or the newspaper office, so that the input unit 113 may fulfilling the same function as the input unit 123 of the collector's terminal 102.

The terminal ID data storage device 113a has stored ID data on a manufacturer's serial No., phone number, owner's name, and terminal holder's name of the terminal. The position locating unit 113b includes a built-in GPS or a present-position locating device that locates the present position of the terminal 101 based upon the communication situation between the terminal 101 and a base station. The image pickup function unit 113c includes an electronic image pickup device such as a digital camera or a digital video camera. The time recording function unit 113d includes a built-in time recorder or a standard radio-wave timepiece. The data-collection-situation reporting unit 113e includes a talking device through which the user of the terminal can talk to a user at another terminal, and a handwriting input device capable of inputting thereto collected data with a pen or in a handwriting manner, or a keyboard capable of inputting thereto collected data by key operation.

The data collector's terminal 102 includes a CPU 120 as a core that controls all other elements of the terminal 102, a receiver 121a that receives a data collection request from the server 103, a RAM 122 that stores information received from the receiver 121a, and a transmitter 121b that transmits data collected at a request of the server 103 to the data collection requester's terminal 101 and the server 103 through the Internet N. The receiver 121a and the transmitter 121b compose a communication unit 121.

The data collector's terminal 102 further includes an input unit 123 that inputs various data thereto, a display device 124 that displays various data, and a ROM 125 that has stored various data beforehand.

Figure 11B:
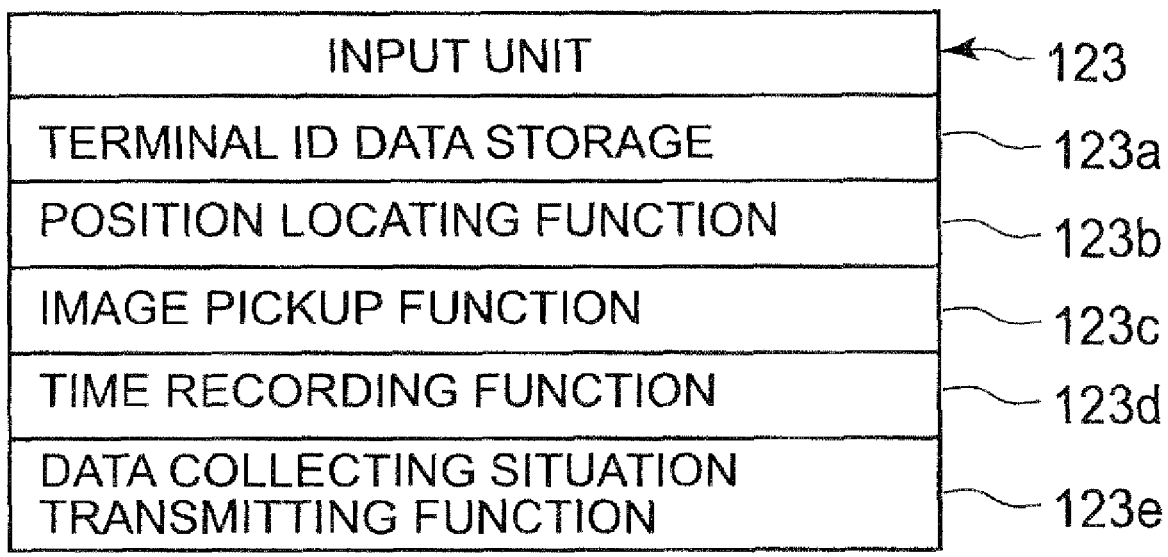
FIG. 11B illustrates the structure of an input unit of a data collector's terminal.

As shown in FIG. 11B, the input unit 123 comprises a terminal ID data storage device 123a that has stored identity data for the data collector's terminal 102 itself, a position locating function unit 123b that locates the present position of the terminal 102 itself, an image pickup function unit 123c that picks up an image of objects around the terminal 1, a time recording unit 123d that records the present date, time and a day of the week, and a data-collecting-situation reporting unit 123e used to report a data collecting situation to the data collection requester's terminal 101 or the newspaper office.

The terminal ID data storage device 123a has stored ID data on a manufacturer's serial No., phone number, owner's name, and terminal holder's name of the terminal. The position locating function unit 123b includes a built-in GPS or a present-position locating device that locates the present position of the terminal 102 based upon the communication situation between the terminal 102 and a base station. The image pickup unit 123c includes an electronic image pickup device such as a built-in digital camera or a digital video camera. The time recording function unit 123d includes a built-in time recorder or a standard radio wave timepiece. The data-collection-situation reporting function unit 123e includes a talking device through which the user of the terminal can talk to a user at another terminal, and a handwriting input device capable of inputting thereto collected data with a pen or in a handwriting manner, or a keyboard capable of inputting thereto collected data by key operation.

FIG. 12A shows the ROM 109 provided in the management server 103. The ROM 109 includes a data collector recruiting HP (Home Page) information storage area 109a, a registered data collector-related information storage area 109b, a vicinity information storage area 109c, a data collection request information storage area 109d, a data collecting time-limit information storage area 109e and a reward paying request storage area 109f.

The data collector recruiting HP information storage area 109a has stored articles for recruiting data collectors. The registered data collector-related information storage area 109b has stored information related to the registered data collectors that will be reported to the applicants (data collectors or data collection requesters) who applied for recruitment of data collectors. The vicinity information storage area 109c has stored information on the vicinities of a data collector that collects data on an object of data collection, wherein the information on the vicinities of the data collector's terminal will be used to measure the distance between the object of data collection and the position of the data collector's terminal. The data collection request information storage area 109d has stored information to request a registered data collector to collect data. The data-collection time-limit information storage area 109e has stored information on a time limit for supply of collected data to the data collection requester or an acceptable time limit for reporting the collected data to the newspaper office. In the case of the latter time limit, the data-collection time-limit information storage area 109e has stored a list of successive phased acceptable time zones, in each of which the collected data can be accepted and sums of reward corresponding to the respective phased acceptable time zones. The time zones are between a time when the object of data collection appeared or occurred and a time limit for finally inserting data collected on the object of data collection into the newspaper. At an initial stage of occurrence of an object of data collection, the corresponding sum of reward is highest and at the last stage of the time zone, the reward is lowest. The reward-payment-request information storage area 109f has stored information requesting the financial institution to pay a proper reward to a specified data collector.

FIG. 12B shows a ROM 115 provided in the data collection requester's terminal 101. The ROM 115 includes a device ID information storage area 115a that has stored information on the terminal to be used, a position locating function information storage area 115b, an image pickup function information storage area 115c, a time recording function information storage area 115d, a data-collecting-situation transmitting function information storage area 115e and a reward payment request information storage area 115f.

The device ID information storage area 115a has stored information on the ID of the data collection requester's terminal 101, and a registered photographer's name or owner's name. The position locating function information storage area 115b has stored the present position or location of the data collection requester's terminal 101 (latitude, longitude and height) located by a GPS built-in the terminal 101. The image pickup function information storage area 115*c* has stored information on the kind and device name of a digital camera or video camera included in the terminal. The time recording function information storage area 115*d* has stored information indicating whether or not time is obtained by standard radio waves or by a device such as the GPS. The data-collecting-situation transmitting function information storage area 115*e* has stored information indicating means for transmitting collected data. The reward-payment request information storage area 15*f* has stored information to request the financial institution to pay a proper reward to a specified data collector.

FIG. 12C shows a ROM 125 provided in the data collector's terminal 102. The ROM 125 includes a device ID information storage area 125*a* that has stored information on the terminal to be used, a position locating function information storage area 15*b*, an image pickup function information storage area 125*c*, a time recording function information storage area 125*d*, a data-collecting-situation transmitting function information storage area 125*e* and a reward payment request information storage area 125*f*.

The device ID information storage area 125*a* has stored information on the ID of the data collector's terminal 102, and a registered photographer's name or owner's name. The position locating function information storage area 125*b* has stored the present position or location of the terminal 102 (latitude, longitude and height) located by a GPS built-in the terminal 102. The image pickup function information storage area 125*c* has stored information on the kind and device name of a digital camera or video camera included in the terminal. The time recording function information storage area 125*d* has stored information indicating whether or not time is obtained by standard radio waves or by a device such as a GPS. The data-collecting-situation transmitting function information storage area 125*e* has stored information indicating input means such as talking means, handwriting means or a keyboard for transmitting collected data. The reward-payment request information storage area 125*f* has stored information to request the financial institution to pay a proper reward to a specified data collector.

Figure 13B:
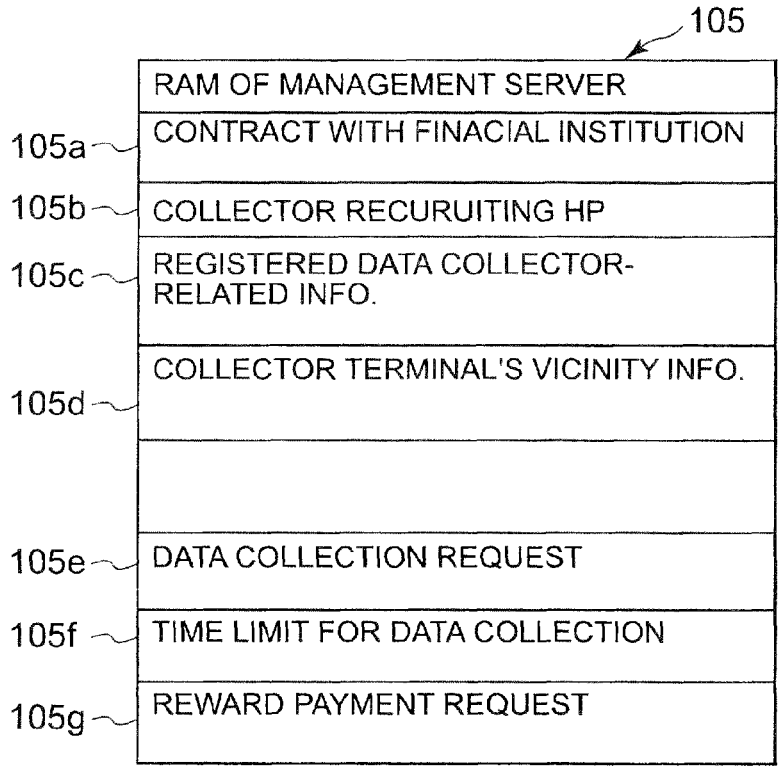
FIG. 13B illustrates the structure of a ROM of the management server.
Figure 13C:
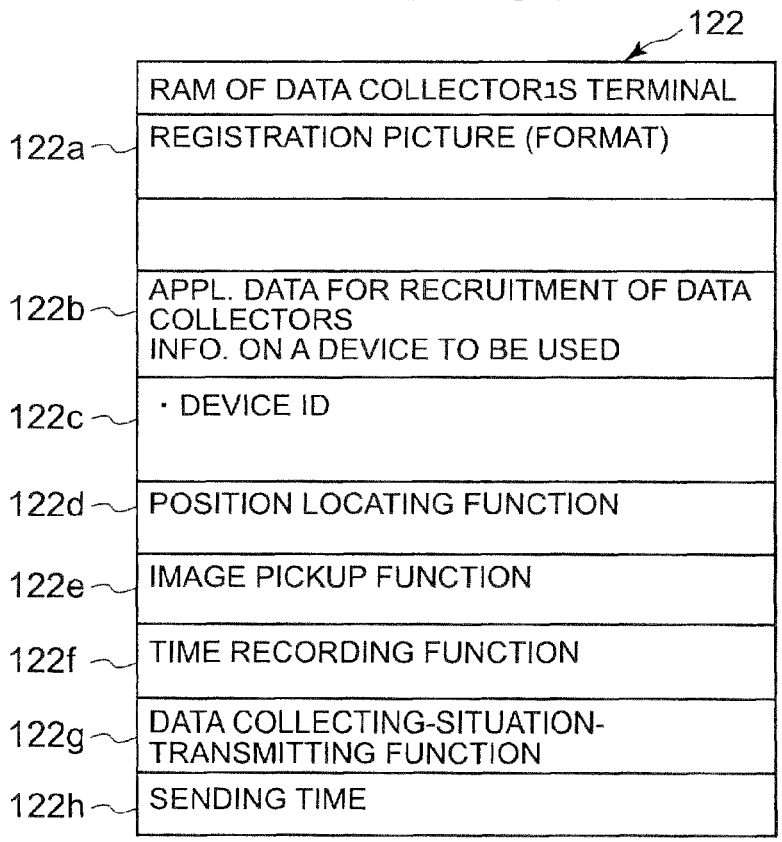
FIG. 13C illustrates the structure of a RAM of the data collector's terminal.

FIGS. 13A, 13B and 13C show RAMs 112, 105 and 122 provided in the data collection requester's terminal 101, the server 103 and the collector's terminal 102, respectively.

The RAM 112 of the data collection requester's terminal 101 comprises a registration picture storage area 112*a*, a data collector application data storage area 112*b*, a device ID information storage area 112*c*, a position locating function information storage area 112*d*, an image pickup function information storage area 112*e*, a time recording function information storage area 112*f*, a data-collecting-situation transmitting function information storage area 112*g* and a sending time storage area 112*h*.

The registration picture storage area 112*a* has stored a registration picture. The data collector application data storage area 112*b* has stored data necessary for applying for recruitment of data collectors. The device ID information storage area 112*c* has stored the ID of the data collection requester's terminal 101 itself, a registered photographer's name or an owner's name. The position locating function information storage area 112*d* has stored the present position or location (latitude, longitude and height) of the data collection requester's terminal 101 located, for example, by a GPS built in the terminal 101. The image pickup function information storage area 112*e* has stored information such as the kind and name of a device such as a built-in digital camera or video camera. The time recording function information storage area 112*f* has stored information about whether or not the time is acquired from the standard radio waves or using a device such as the GPS. The data-collecting-situation transmitting function information storage area 112*g* has stored information about which of talking means, handwriting input means and a keyboard is used to transmit the collected data. The reward-payment-request information storage area 112*h* has stored information to request the financial institution to pay a proper reward to a specified data collector.

The server RAM 105 has a financial institution contract information storage area 105*a*, a data collector recruiting HP information storage area 105*b*, a registered data-collector-related information storage area 105*c*, a vicinity information storage area 105*d*, a data-collection-request information storage area 105*e*, a data-collection time-limit information storage area 105*f* and a reward payment request information storage area 105*g*.

The financial institution contract information storage area 105*a* has stored information on contracts exchanged between the server 103 and the financial institution. The data collector recruiting HP information storage area 105*b* has stored articles on recruitment of data collectors. The registered data-collector-related information storage area 5*c* has stored information related to the registered data collector that is reported to the applicant who applied for the recruitment of the data collectors. The vicinity information storage area 105*d* has stored information on the vicinities of the data collector's terminal that collects data of an object of data collection, wherein the information on the vicinities of the data collector's terminated will be used to measure the distance between the data collector's terminal and the object of data collection. The data collection request information storage area 105*e* has stored information requesting a registered data collector to collect data. The data-collection time-limit information storage area 105*f* has stored information on a time limit for data collection which will be reported to the registered data collector. More particularly, the data collecting time-limit information storage area 105*f* has stored a list of successive phased acceptable time zones, in each of which the collected data can be accepted and sums of reward corresponding to the respective phased acceptable time zones. The zones are between a time when the object of data collection appeared or occurred and a time limit for finally inserting data collected on the object into the newspaper. At the initial stage of occurrence of an event or accident of data collection, the sum of reward is highest. At a later phase of time, the reward is lower, and at the last phase of time in which the collected data can be inserted in the newspaper narrowly in time, the reward is lowest. The reward payment request information storage area 105*g* has stored information requesting the financial institution to pay a proper reward to a specified data collector.

The RAM 122 of the data collector's terminal has a registration picture storage area 122*a*, a data collector application storage area 122*b*, a device ID information storage area 112*c*, a position locating function information storage area 112*d*, an image pickup function information storage area 112*e*, a time recording function information storage area 112*f*, a data-collecting-situation transmitting function information storage area 112*g* and a sending-time storage area 112*h*.

The registered picture storage area 122*a* has stored a registration (form) picture. The data collector application data storage area 122*b* has stored data necessary for applying for recruitment of data collectors. The device ID information storage area 122*c* has stored the ID of the data collection requester's terminal 101 itself, a registered photographer's name or an owner's name. The position locating function information storage area 122*d* has stored the present position or location (latitude, longitude and height) of the data collection requester's terminal 101 located, for example, by a GPS built in the terminal 101. The image pickup function information storage area 122e has stored information such as the kind and name of a device such as a built-in digital camera or video camera. The time recording function information storage area 122f has stored information about whether or not the time is acquired from the standard radio waves or using a device such as the GPS. The data-collecting-situation transmitting function information storage area 122g has stored information about which of talking means, handwriting input means and a keyboard is used to transmit the collected data. The reward-payment-request information storage area 122h has stored information to request the financial institution to pay a proper reward to a specified data collector.

Figure 14:
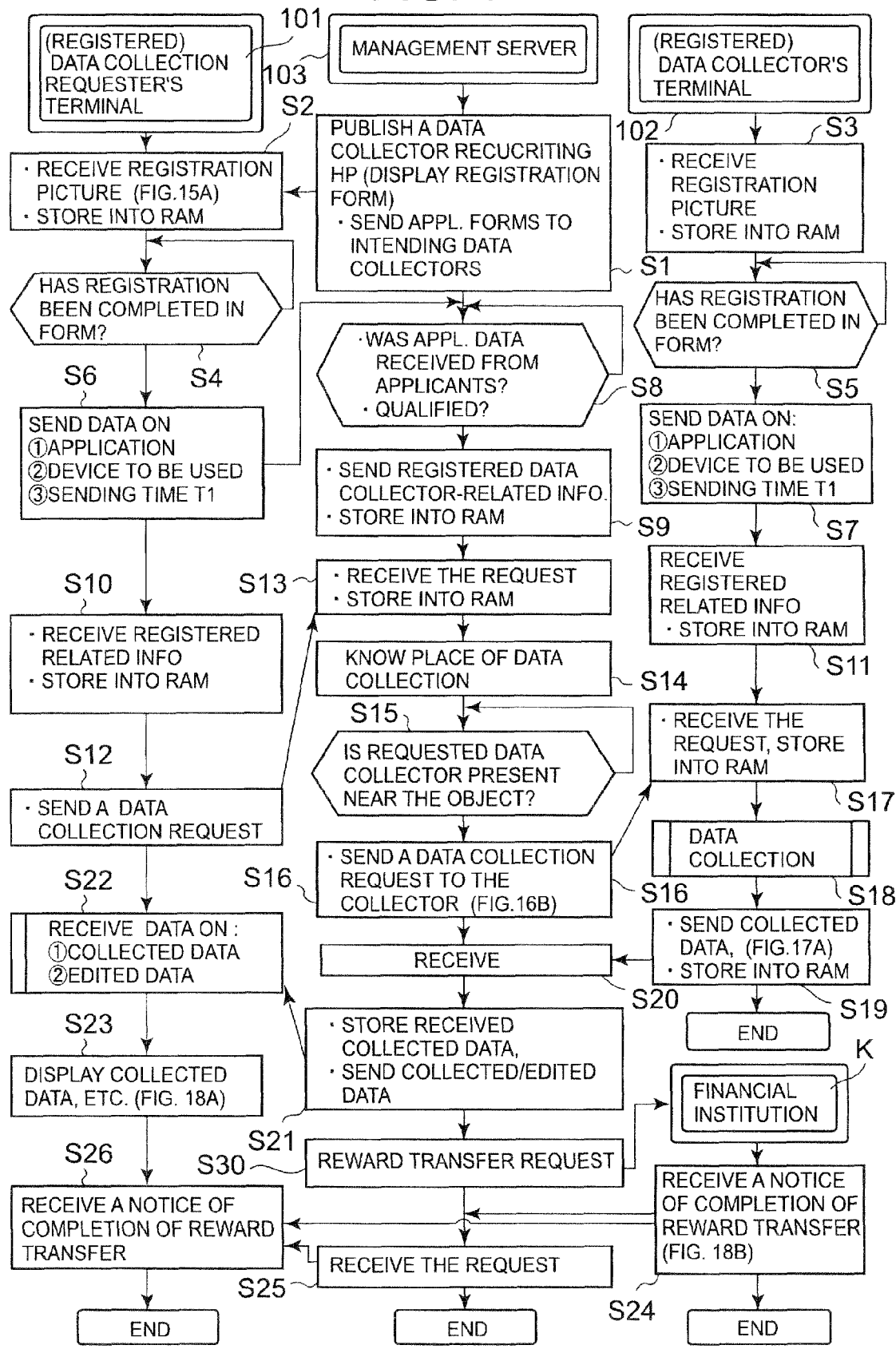
FIG. 14 illustrates processes to be performed by the terminals of the collected data providing system of the second embodiment.
Figure 15A:
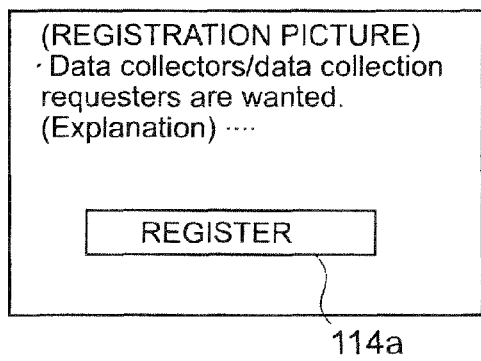
FIG. 15A illustrates a data collector/data collection requester recruiting and registering picture displayed on each of the data collector terminal and data collection requester's terminal.

FIG. 14 shows processes which will be performed by the data collection requester's terminal 101, management server 103 and data collector's terminal 102. First, the server 103 publishes a data collector recruiting HP (home page) on the Internet to thereby display a registration form such as shown in FIG. 15A. When a data collection requester accesses the server 103 through the Internet N, using his or her terminal 101, the registration form displayed on the server 103 is sent from the server 103 to the requester's terminal 101 through the Internet N (step S1). The requester's terminal 101 receives registration picture data including the registration form and stores the registration picture data in the storage area 112a of RAM 112 (step S2).

Similarly, when the data collector accesses the server 103 through the Internet N, using his or her terminal 102, the registration form displayed on the server 103 is sent from the server 103 to the data collector's terminal 102 through the Internet N (step S1). The data collector's terminal 102 receives registration picture data including the registration form and stores the registration picture data in the storage area 112a of RAM 122 (step S3).

When the registration picture (FIG. 15A) is displayed on each of the terminals 101 and 102, the data collection requester and the data collector input data on their respective names, and the respective types of the terminals 101 and 102 in accordance with the explanation about "recruitment of data collectors/data requesters".

Figure 15B:
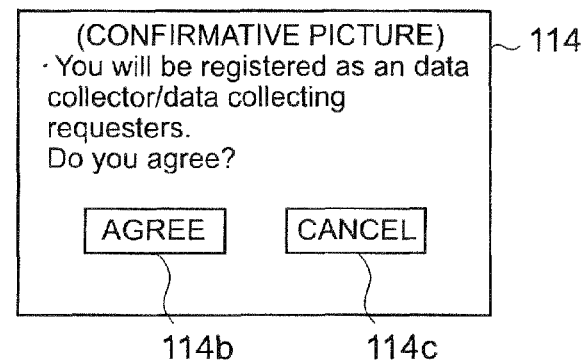
FIG. 15B illustrates a registration confirming picture displayed on each of the data collector's terminal and data collection requester's terminal.

In a state where the received registration form picture is displayed on the display 114, as shown in FIG. 15A, CPU 110 determines whether or not a soft button "REGISTER" 114a on the picture was clicked. If it was clicked, the registration form picture is displayed as a confirmative picture on the display 114, as shown in FIG. 15B.

In a state where the registration form picture is displayed on the display 114, CPU 110 determines which of a soft button "COMFIRM" 14b and a soft button "CANCEL" 14c was clicked. When CPU 110 determines that the finally confirming soft button "COMFIRM" 14b was clicked, CPU 110 terminates the determining process (steps S4, S5).

When the determining process has been terminated, each of the terminals 101 and 102 sends the server 103 the following data: that is, ①its application data, ②information on a device that the user uses, and ③a confirmative operation time (sending time) T1 (steps S6, S7). The ①application data represents the applicant's will apply for the recruitment of data collectors/data collection requesters published this time, the ②information on a device represents the terminal's ID, position locating function, image pickup function, time recording function, and data-collecting-situation transmitting function stored respectively in the storage areas 115a-115e and 125a-125f of ROMs 115 and 125 or the storage areas 112c-112g and 122c-122g of RAMs 112 and 122 of the terminals 101 and 102, and the ③confirmative operation (sending time) T1 represents the time when the soft button "CONFIRM" 114b was clicked.

After steps S6 and S7, the server 103 receives application data sent by the data collection requester's and data collector's terminals 101 and 102, and stores the data in the storage areas 105b of RAMs 105 thereof (step S8). The server 103 then compares the data received from the terminals 101 and 102 and the device types, etc., stored beforehand in ROM 9 of the server 103 to thereby determine whether or not the terminal 101 and 102 themselves are qualified as devices (step S8).

Figure 16A:
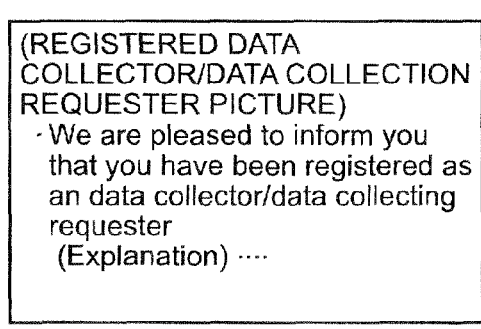
FIG. 16A illustrates a registered data collector/data collector requester picture displayed on each of the data collector's terminal and data collection requester's terminal.

If they are qualified, the server 103 sends registered data collection requester/data collector picture data of FIG. 16A as registered data collection requester/data collector-related information to the terminals 101/102 and also stores it into RAM 105c (step S9).

The data collection requester's and data collectors' terminals 101 and 102 then receive the registered requester and collector-related information sent by the server 103 (steps S10, S11). The requester/collector can view registered requester/collector picture of FIG. 16A and know that they have been registered as a data collection requester/data collector in the server 103.

In the same manner, many applicants in the whole country or world apply for recruitment of data collection requesters/data collectors through their terminals 101/102, and qualified data collection requesters and data collectors are selected from among the applicants through their terminals and then registered as such in the server 103. Since this time, they will act as the registered data collection requesters and data collectors individually.

Figure 16B:
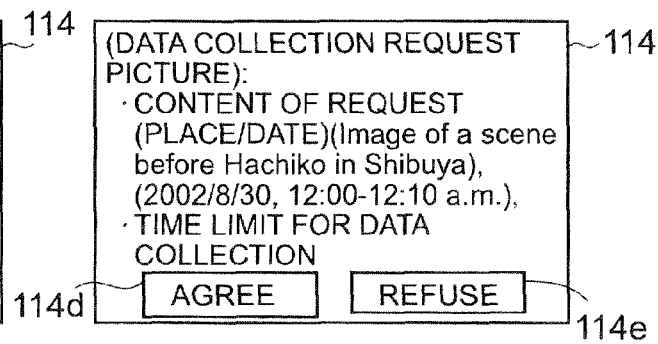
FIG. 16B illustrates a data collection requesting picture displayed on each of the data collector's terminal and data collection requester's terminal.

FIG. 16B illustrates a data collection request picture. The data collection requester inputs information on a data collection request to his or her terminal 101, using its input unit 13, for example, handwriting input unit. The content of the request includes ①place (for example, "before Hachiko, in Shibuya"), ②date (for example "12:00-12:10 a.m., Aug. 30, 2002"), ③type of image pickup (for example, a "complete view"), ④time limit for sending the collected data (for example, "1:00 p.m.").

Inputting such data collection request and then confirming such input information on the display screen, the data collection requester determines whether or not such request is acceptable, and then clicks the soft button "AGREE" 14d or the soft button "REFUSE" 14e. The data collection requester's terminal 102 determines which of the buttons 14d and 14e was clicked. If the soft button "AGREE" 14d was clicked, CPU 110 determines the clicking of this button, terminates the determining process, and then sends the input data collection request to the server 103 (step S12).

When the server 103 receives this request, it stores the request information into RAM 122 (step S13). The server 103 then knows a place of data collection included in the request from the requester's terminal 101 (step S14). The place of data collection (for example, "Before Hachiko, in Shibuya") is specified by its latitude, longitude and height included in the information on the request. There are many methods of knowing the place of data collection. For example, it may be acquired by using a storage table or a ROM that has stored famous buildings and their place names in correspondence to their latitudes and longitudes.

Then, the server 103 determines whether a data collector with a terminal 102 is present in the vicinity of the located place of data collection (step S15). This determination is performed by comparing information on the position of the place of data collection (latitude, longitude, etc.) included in the data collection request and information on the present positions of the other registered data collectors' terminals 102 received periodically from the other registered data collectors' terminals 102.

The determination about whether or not there is a data collector's terminal 102 present in the vicinity of the place of data collection varies depending upon the object or scene and type of data collection. In this embodiment the server 103 it is determines whether or not there is a data collector's terminal 102 present, for example, within a sphere of a radius of one kilometer from the present position of the object included in the request information or the corresponding position information.

When the server 103 determines at step S15 that there are no data collectors' terminals 102, the server 103 expands, with the position of the place of data collection as the center or in consideration of corresponding position information, its range of search for the data collector's terminal 102 to try to find the collector's terminal 102. As a result, if the server 103 finds the data collector's terminal 102, the server 103 sends the collector a data collection request (step S16). This request information includes the content of the request and a time limit for the data collection, for example, as shown in FIG. 16B.

The terminal 102 receives this request information as data on a data collection request picture of FIG. 16B (step S17). Since this request is urgent, the terminal 102 informs its user, i.e. data collector of reception of this request by sounds or vibrations which are produced by a reporting unit 100 or by a message displayed on the display 114 thereof.

The data collector's terminal 102 receives and confirms this data collection request on the display, and then determines whether or not he or she can accept the content of the request and the time limit for data collection. The data collector then clicks the soft button "AGREE" 14d or the soft button "REFUSE" 14e. CPU 120 then determines which of the two buttons was clicked. If CPU 120 determines that the soft button "AGREE" 14d was clicked, CPU 120 terminates this determining process. Then, the data collector at the terminal 102 starts his or her activities of data collection (step S18).

The collector's activities mainly include image pickup of the scene of an accident or an object of data collection through the digital camera or the like and handwriting of the name of the place of the scene or object and the situation of the scene or object, in accordance with the data collection request on the "data collection request picture" of FIG. 16B.

Figure 17A:
FIG. 17A illustrates a data collection picture displayed on the data collector's terminal.

The data collector stores a picked-up image into RAM 122, while confirming the data collection picture displayed on the display 124 of the terminal 102 shown in FIG. 17A, and writes data on the present situation of the place of the scene. Information on ① place of data collection (its position and name), ② data collection time and term, ③ data collector's name (terminal ID and a photographer's name, and ④ picked-up image, and ⑤ device information may be inputted at the input unit 123 by the collector 102 and displayed on the display 124. Alternatively, they may be automatically displayed on the display 124 based upon the information stored in the ROM 125 or RAM 122 of the terminal 102.

Figure 17B:
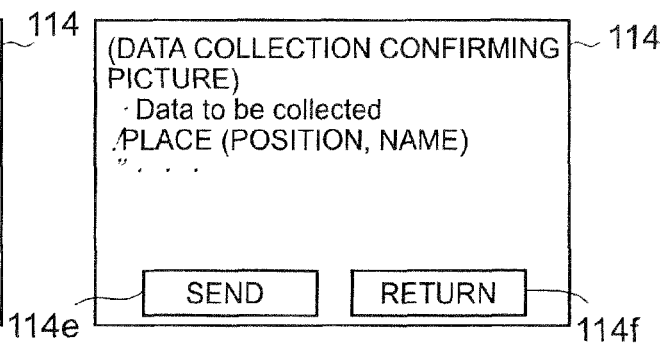
FIG. 17B illustrates a data collection confirming picture displayed on the data collector's terminal.

When the collector at the terminal 102 completes the collection of data at step S18, the collector clicks the soft button "SEND" 14e or soft button "RETURN" 14f while confirming the "data collection confirming picture" of FIG. 17B. The CPU 120 of the terminal 102 determines which of the soft buttons 14e and 14f was clicked. If CPU 120 determines that the soft button "SEND" 14e was clicked, CPU 120 terminates this determining process (step S18).

When the determining process (at step S18) is terminated, CPU 120 shifts its control to step S19, where CPU 120 sends the server 103 ① collected data and ② a sending time T1. The ① collected data includes a picked-up image of the object or scene of an accident or event of data collection, the name of the place of the scene or object and its present situation. The ② sending time T1 represents the time recorded by the time recording function of the terminal 102 when the soft button "SEND" 14e of the terminal 102 of FIG. 17B was clicked.

The server 103 receives the collected data and sending time T1 sent by the terminal 102 (step S20). The server 103 then stores the received collected data and sending time T1 in RAM 105. Then, the server 103 also stores an arrival time T2 of the data received from the data collector 102 and then edits the collected data.

Figure 18A:
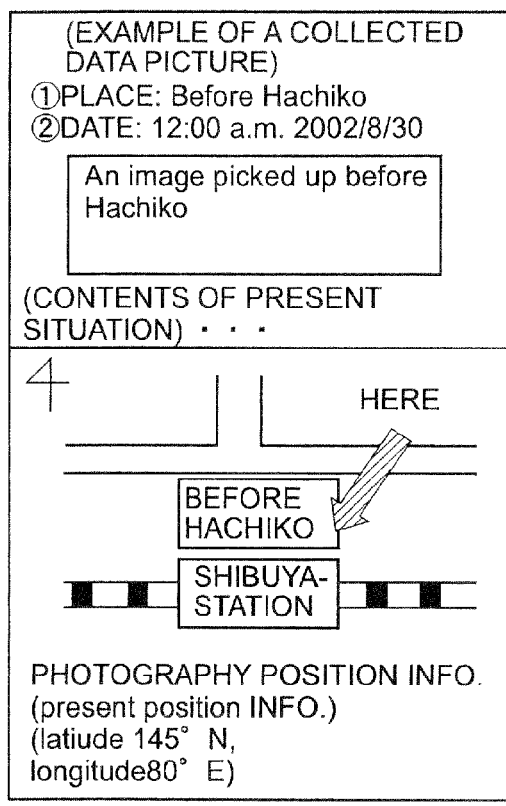
FIG. 18A illustrates a data collection picture displayed on the data collection requester's terminal.

A result of the edition is displayed as a picture such as an "example of a collected data picture" of FIG. 18A. For example, an "image picked up "before Hachiko" was picked up at a place: "Before Hachiko" by the data collector by the terminal 102. The data "① Place: Before Hachiko" and "② Date:" are inputted to the terminal 102 by the data collector.

The server 103 sends the collected or edited picture data to the data collection requester's terminal 101 (step S21). The server 103 has stored maps of local areas each of which includes positions with latitudes and longitudes in ROM 109. Thus, when the server 103 acquires data on the present position (latitude and longitude) of the terminal 102, it may send the data collection requester's terminal 101 at least one of local area data including data on the present position of the terminal 102 (latitude and longitude), and a map and weather of the area including the present position of the terminal 102 as part of the collected or edited data.

After the server 103 sent the collected data to the data collection requester's terminal 101, it then sends the financial institution's terminal K, which has beforehand contracted with the data collection requester's terminal 101 for payment, a request for the financial institution to pay a reward for the collection of data by the collector's terminal 102 to the data collector 102 on behalf of the requestor 101 (step S30).

When the requester's terminal 101 receives from the server 103 the data collected by the terminal 102 and edited or unedited by the server 103 (step S22), it stores the data in RAM 112 and displays it on the display 114 (step S23). Thus, the requester at the terminal 101 can rapidly, securely and visually confirm that data displayed on the display 114.

Figure 18B:
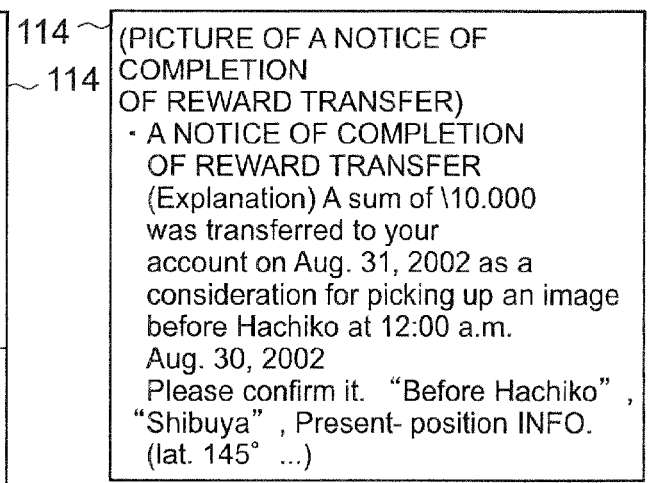
FIG. 18B illustrates a notice-of-completion-of-reward-transfer picture displayed on the data collection requester's terminal.

When the financial institution's terminal K receives a request to transfer a proper reward, it transfers the reward to the account of the data collector's terminal 102 at the request and also sends a notice of completion of reward transfer to the terminal 102 and the server 103 (step S24). The notice of completion of reward transfer is shown, for example, as a picture of a "notice of completion of reward transfer" with an "explanation", as shown in FIG. 18B. Alternatively, the notice of completion of reward transfer may be sent via the server 103 to the terminal 102. The data collector's terminal 102 receives this notice from the financial institution's terminal K or the server 3 (step S26).

While in this embodiment both the terminals 101 and 102 are illustrated as including a commercially available cellular phone with a camera function, the present invention is not limited to this particular case.

Figure 19:
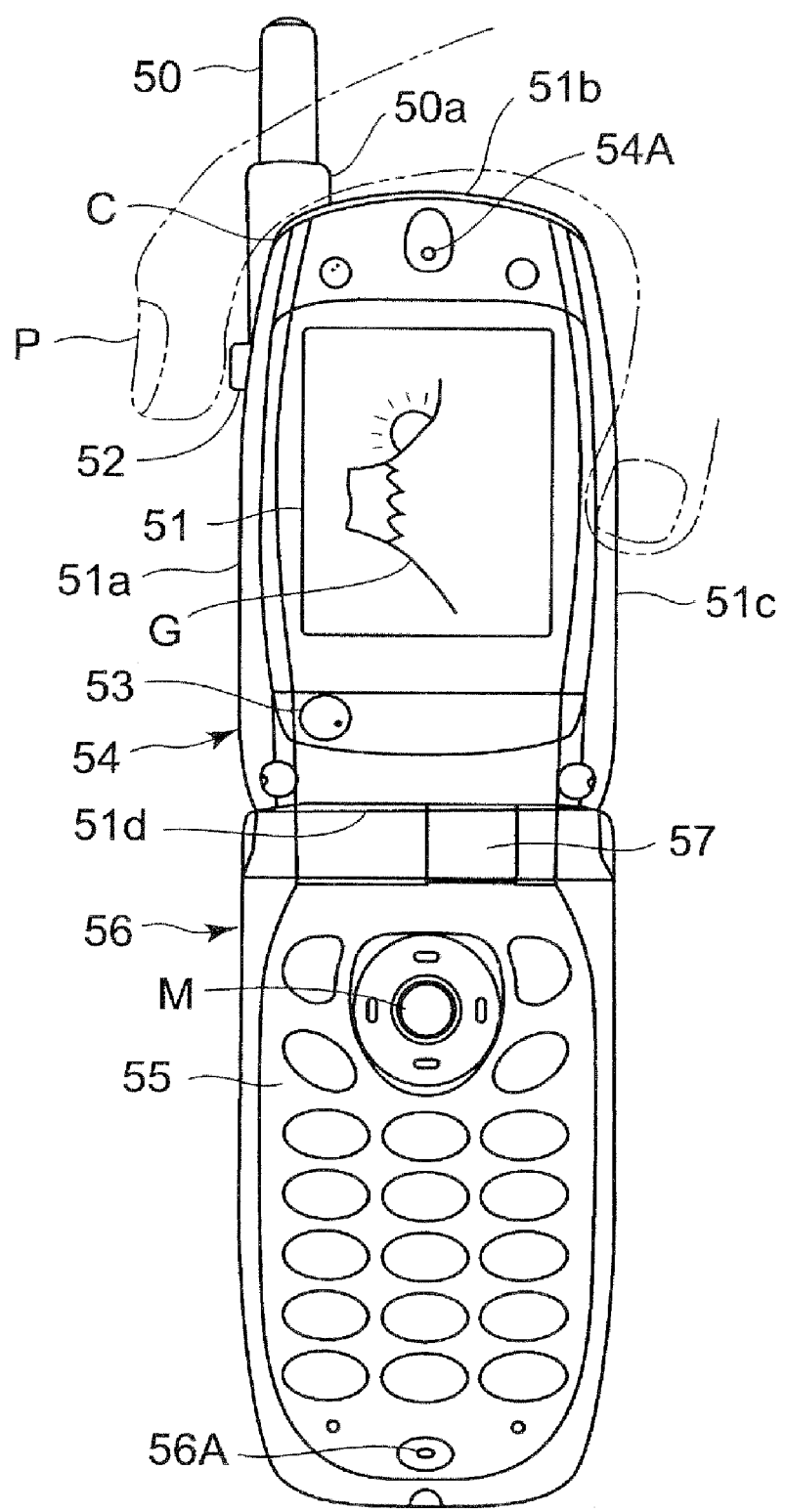
FIG. 19 is a plan view of another example of a cellular phone with an image pickup function for use in each of a data collection requester's terminal and the data collector's terminal.
Figure 20:
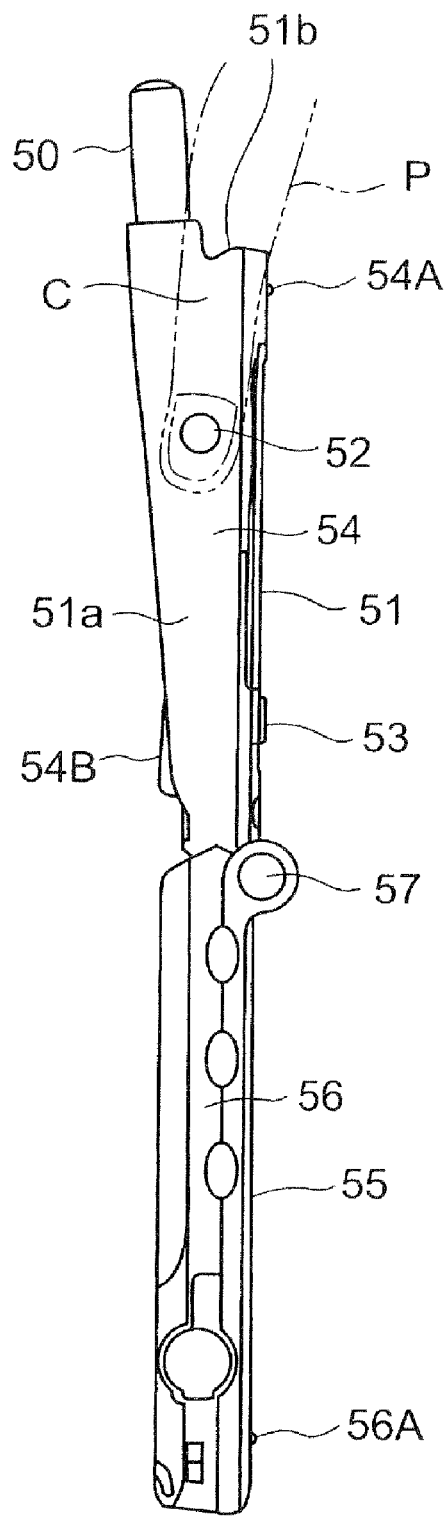
FIG. 20 is a side view of the cellular phone of FIG. 19.
Figure 21:
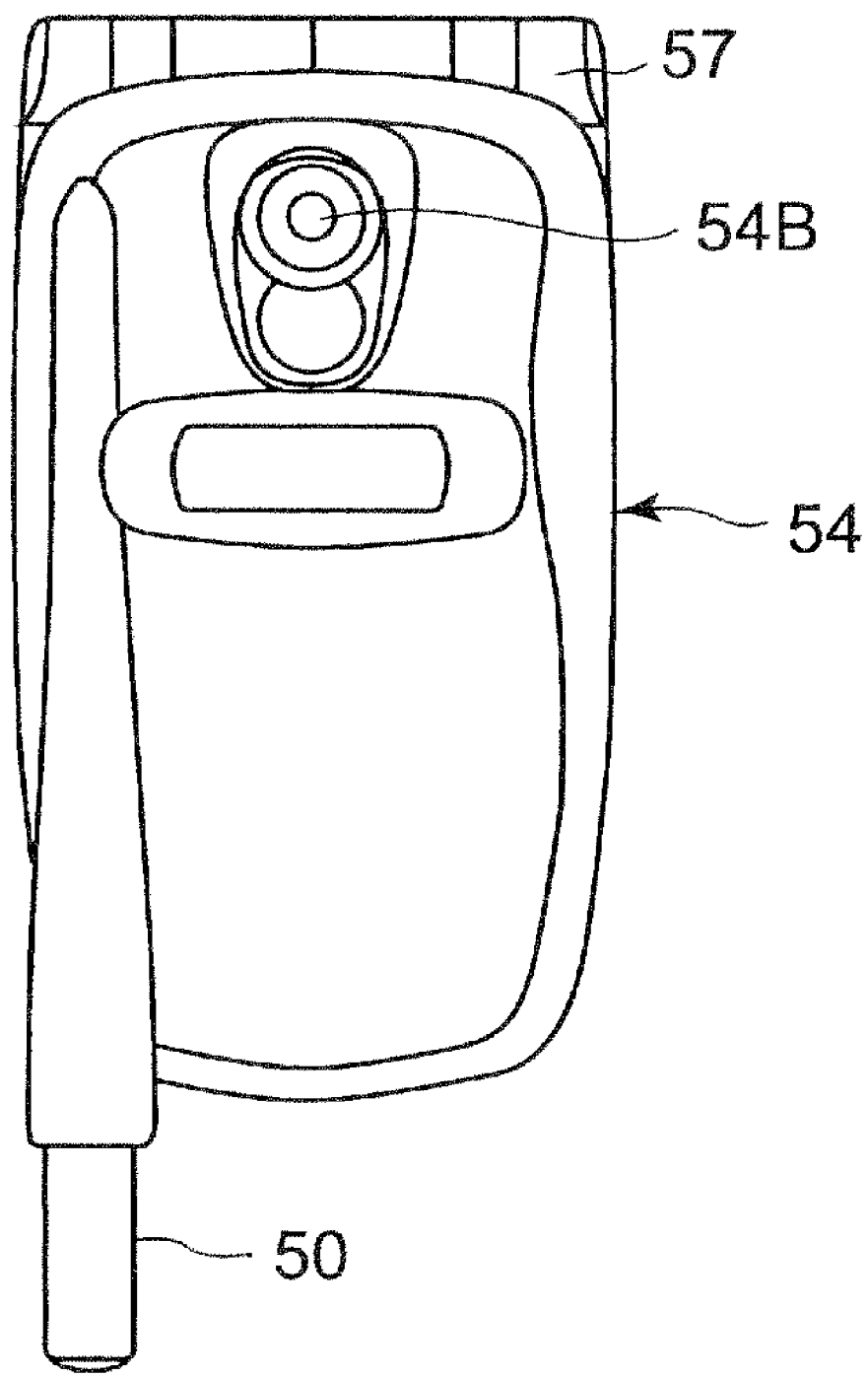
FIG. 21 is a back view of the cellular phone of FIG. 19.

FIGS. 19-21 illustrate another cellular phone with an image pickup function for use as the data collection requester's terminal 101 and the data collector's terminal 102.

This cellular phone D comprises a first body 54 that includes an antenna 50, a display 51, a shutter switch 52, a finder 53, a speaker 54A, and a camera 54B; and a second body 56 that includes a keyboard 55 and a microphone 56A. The first body 54 is hinged foldable to the second body 56. The first and second bodies 54 and 56 take the form of a rectangle. The first body 54 includes a first, second, third and fourth sides 51a, 51b, 51c and 51d.

The antenna 58 projects outward from the boundary between a back of the first body and a corner between the first and second sides 51a and 51b. The shutter switch 52 is provided at the base of the antenna 50 on an arcuate corner C between the first and second sides 51a and 51b. Thus, the phone D can be held at an upper portion of the first body 54 thereof between a thumb and a first finger P, for example, of a right hand of the user such that the first finger P extends along the first and second sides 51a and 51b of the first body and is positioned on its second finger side by the antenna 50 so as to be able to press the shutter switch 52 at the first finger end, as shown in FIG. 19.

The display 51 corresponds to the respective displays 14 and 24 of FIG. 10. When an image pickup mode is set by a mode changeover switch M, the display 51 is switched to a picture screen with the long sides at top and bottom. The user operates the shutter switch 52 with his or her first finger to thereby pick up an image of an external object displayed on the display 51 and store it into RAMs 112 and 122 while confirming the image of the external object.

The finder 53 is provided at a corner between the first and fourth sides 51e and 51d to thereby pick up the image of the external object while visually confirming the image of the external object appearing in the finder 53.

The user at the phone D is able to talk with a second user at a second phone D through their speakers 54a and microphones 56a in an ordinary manner. In addition, the user at the phone D is also able to switch the display 51 to one with the long sides at top and bottom, and to operate the shutter switch 52 with his or her first finger P positioned by the antenna 50 while confirming the image of the external object G displayed on the display 51 to thereby pick up the image of the external object rapidly and securely and store it into the RAMs 12 and 22.

While in this embodiment the requester's terminal 101 and the server 103 are illustrate as including a portable personal computer, the present invention is not limited to this particular case. They may be another portable terminal or electronic device such as a PDA, an electronic notebook or a cellular phone.

As described above, according to this embodiment a collected data providing apparatus receives a data collection request from a data collection requester's terminal, and tramsmits the data collection request to a data collector' terminal in the vicinity of a place of data collection indicated by information included in the data collection request. The apparatus also receives from the data collector's terminal the data collected by the data collector's terminal at the data collection request, and transmits the data collection requester's terminal the received collected data. Therefore, the collected data providing apparatus is capable of receiving a data collection request from a data collection requester's terminal, transmitting the data collection request to a data collector' terminal in the vicinity of a place of data collection indicated by information included in the data collection request, receiving from the data collector's terminal the data collected by the data collector's terminal at the data collection request, and transmitting the data collection requester's terminal the collected data.

Also, according to this embodiment the collected data providing apparatus receives a data collection request from a data collection requester's terminal, and transmits the data collection request to a data collector' terminal in the vicinity of a place of data collection and having device information indicated by information included in the data collection request. The apparatus also receives from the data collector's terminal the data collected by the data collector's terminal at the data collection request, and transmits the data collection requester's terminal the received collected data. Therefore, the apparatus is capable of receiving a data collection request from a data collection requester's terminal, transmitting the data collection request to a data collector' terminal in the vicinity of a place of data collection and having device information indicated by information included in the data collection request, receiving from the data collector's terminal the data collected by the data collector's terminal at the data collection request, and transmitting the data collection requester's terminal the received collected data.

Also, according to this embodiment the collected information providing apparatus receives a data collection request sent by a data collection requester's terminal, finds a data collector's terminal present in the vicinity of a place of data collection indicated by information included in the request, transmits the received request to the data collector's terminal, receives from the data collector's terminal the data collected by the data collector's terminal at the request, and transmits the data collection requester's terminal the received collected data. Therefore, the collected information providing apparatus is capable of receiving a data collection request sent by a data collection requester's terminal, finding a data collector's terminal present in the vicinity of a place of data collection indicated by information included in the request, transmitting the received request to the data collector's terminal, if any, receiving from the data collector's terminal the data collected by the data collector's terminal at the request, and transmitting the data collection requester's terminal the received collected data.

Also, according to this embodiment the portable data collecting terminal apparatus receives a data collection request from a data collection requester' terminal through an management server, displays the received data collection request on a display, and transmitting the management server data collected at the data collection request displayed on the display. Therefore, the portable data collecting terminal apparatus is capable of receiving a data collection request from the data collection requester' terminal through the management server, displaying the received data collection request on the display, and transmitting the management server data collected at the data collection request displayed on the display.

Also, according to this embodiment the portable data-collecting terminal apparatus is connected to a management server through a network. The portable terminal apparatus transmits the management server a request to collect data on a specified place including information on the position of a specified place including information on the position of the specified place, and receives from the management server the collected data on the specified place. Therefore, the portable terminal apparatus is capable of transmitting the management server a request to collect data on a specified place including information on the position of the specified place, and receiving from the management server the collected data on the specified place.

What is claimed is:

1. A collected data providing apparatus comprising:
  a locating unit for locating a position of an object of data collection;

a finding unit for finding a portable terminal present in a vicinity of the object of data collection located by the locating unit;

a transmitter for transmitting to the found portable terminal a request to collect data on the object of data collection;

a receiver for receiving from the portable terminal the data collected by the portable terminal in accordance with the request; and a control unit for controlling the apparatus so that the apparatus publishes a data collector recruiting homepage on the Internet before the receiver receives the collected data, determines whether an applicant who applied for recruitment is qualified based upon received application data, registers the applicant as a qualified data collector if the applicant is qualified, and sends the registered applicant related information.

2. A collected data providing apparatus comprising:

a locating unit for locating a position of an object of data collection;

a finding unit for finding a portable terminal present in a vicinity of the object of data collection located by the locating unit;

a transmitter for transmitting to the found portable terminal a request to collect data on the object of data collection;

a receiver for receiving from the portable terminal the data collected by the portable terminal in accordance with the request; and a control unit for controlling the apparatus so that the apparatus publishes a data collector recruiting homepage on the Internet before the receiver receives the collected data, determines whether an applicant who applied for recruitment is qualified based upon received application data, registers the applicant as a qualified data collector if the applicant is qualified, sends the registered data collector related information, and receives data on objects of data collection from third parties including registered data collectors before or after the related information is sent to the registered data collector.

3. A collected data providing apparatus comprising:

a locating unit for locating a position of an object of data collection;

a finding unit for finding a portable terminal present in a vicinity of the object of data collection located by the locating unit;

a transmitter for transmitting to the found portable terminal a request to collect data on the object of data collection;

a receiver for receiving from the portable terminal the data collected by the portable terminal in accordance with the request; and a control unit for controlling the apparatus so that the apparatus publishes a data collector recruiting homepage on the Internet before the receiver receives the collected data, determines whether an applicant who applied for recruitment is qualified for the position based upon received application data, registers the applicant as a qualified data collector if the applicant is qualified, sends the registered data collector related information, and receives data on objects of data collection from third parties including registered data collectors before or after the related information is sent to the registered data collector, wherein the position of the object of data collection located by the locating unit is indicated by the data on the object of data collection received under control of the control unit.

* * * * *